(12) United States Patent
Shin et al.

(10) Patent No.: US 11,509,883 B2
(45) Date of Patent: Nov. 22, 2022

(54) ELECTRONIC DEVICE

(71) Applicant: LG ELECTRONICS INC., Seoul (KR)

(72) Inventors: Seungyong Shin, Seoul (KR); Changkyu Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 319 days.

(21) Appl. No.: 16/491,549

(22) PCT Filed: Aug. 20, 2019

(86) PCT No.: PCT/KR2019/010578
§ 371 (c)(1),
(2) Date: Sep. 5, 2019

(87) PCT Pub. No.: WO2020/189864
PCT Pub. Date: Sep. 24, 2020

(65) Prior Publication Data
US 2021/0337181 A1    Oct. 28, 2021

Related U.S. Application Data

(60) Provisional application No. 62/820,278, filed on Mar. 19, 2019.

(51) Int. Cl.
*H04N 13/327* (2018.01)
*H04N 13/207* (2018.01)
(Continued)

(52) U.S. Cl.
CPC ....... *H04N 13/327* (2018.05); *G02B 27/0172* (2013.01); *G02C 5/12* (2013.01);
(Continued)

(58) Field of Classification Search
USPC .......................................................... 348/47
See application file for complete search history.

(56) References Cited

U.S. PATENT DOCUMENTS

| 10,345,600 | B1* | 7/2019 | Chi | .................. G02B 27/0093 |
| 2013/0038510 | A1* | 2/2013 | Brin | .................... G02B 27/017 |
| | | | | 345/8 |

(Continued)

FOREIGN PATENT DOCUMENTS

| KR | 1020140059213 | 5/2014 |
| KR | 1020170128608 | 11/2017 |

OTHER PUBLICATIONS

PCT International Application No. PCT/KR2019/010578, International Search Report dated Dec. 18, 2019, 3 pages.

*Primary Examiner* — Behrooz M Senfi
(74) *Attorney, Agent, or Firm* — Lee, Hong, Degerman, Kang & Waimey PC

(57) ABSTRACT

An electronic device is disclosed. The electronic device comprises: a first display for the left eye of a user; a second display for the right eye of the user, that is spaced apart from the first display in a one direction; frames that hold the first display and the second display and are supported on the user's head; and an optical variable unit capable of varying the optical alignment of the first display or second display. An electronic device according to the present invention may be associated with an artificial intelligence module, robot, augmented reality (AR) device, virtual reality (VR) device, and device related to 5G services.

18 Claims, 26 Drawing Sheets

(51) Int. Cl.
*H04N 13/344* (2018.01)
*H04N 13/239* (2018.01)
*H04N 13/366* (2018.01)
*G02B 27/01* (2006.01)
*G02C 5/12* (2006.01)

(52) U.S. Cl.
CPC ......... *H04N 13/207* (2018.05); *H04N 13/239* (2018.05); *H04N 13/344* (2018.05); *H04N 13/366* (2018.05); *G02B 2027/014* (2013.01); *G02B 2027/0132* (2013.01); *G02B 2027/0178* (2013.01)

(56) References Cited

U.S. PATENT DOCUMENTS

| | | | |
|---|---|---|---|
| 2015/0077312 A1 | 3/2015 | Wang | |
| 2016/0033770 A1* | 2/2016 | Fujimaki | H04N 13/344 345/8 |
| 2017/0296421 A1* | 10/2017 | Travers | A61H 5/00 |
| 2018/0074322 A1* | 3/2018 | Rousseau | G02B 27/017 |
| 2019/0235244 A1* | 8/2019 | Kamiya | G02B 27/0176 |
| 2019/0333480 A1* | 10/2019 | Lang | G02B 27/017 |
| 2021/0337181 A1* | 10/2021 | Shin | H04N 13/366 |

\* cited by examiner (a)          (b)

(a)

(b)

(c)

(d)

(e)

(f)

(a)

(b)

(c)

(d)

(a)

(b)

(c)

(d)

(a)

(b)

(c)

(a)

(b)

(a)

(b)

(a)

(b)

(a)

(b)

ELECTRONIC DEVICE

CROSS-REFERENCE TO RELATED APPLICATIONS

This application is the National Stage filing under 35 U.S.C. 371 of International Application No. PCT/KR2019/010578, filed on Aug. 20, 2019, and also claims the benefit of U.S. Provisional Application No. 62/820,278, filed on Mar. 19, 2019, the contents of which are all incorporated by reference herein in their entirety.

BACKGROUND OF THE INVENTION

Field of the Invention

The present invention relates to an electronic device and, more particularly, to an electronic device used for Virtual Reality (VR), Augmented Reality (AR), and Mixed Reality (MR).

Related Art

Virtual reality (VR) refers to a special environment or situation generated by man-made technology using computer and other devices, which is similar but not exactly equal to the real world.

Augmented reality (AR) refers to the technology that makes a virtual object or information interwoven with the real world, making the virtual object or information perceived as if exists in reality.

Mixed reality (MR) or hybrid reality refers to combining of the real world with virtual objects or information, generating a new environment or new information. In particular, mixed reality refers to the experience that physical and virtual objects interact with each other in real time.

The virtual environment or situation in a sense of mixed reality stimulates the five senses of a user, allows the user to have a spatio-temporal experience similar to the one perceived from the real world, and thereby allows the user to freely cross the boundary between reality and imagination. Also, the user may not only get immersed in such an environment but also interact with objects implemented in the environment by manipulating or giving a command to the objects through an actual device.

Recently, research into the gear specialized in the technical field above is being actively conducted.

An electronic device that offers the above virtual reality, augmented reality, or augmented reality normally uses two lenses for the left and right eyes. Thus, the optical alignment of the two lenses is very important to get a clear image. In particular, the optical alignment of the left and right eyes can be more important to create a 3D effect.

However, conventional electronic devices have no capability of re-adjusting the optical alignment of the left and right eyes when there is a relative deviation between the two lenses due to a change in a user's physical condition, such as a change in the shape or size of the head.

Accordingly, the conventional electronic devices adopted a structure capable of physically preventing a deviation between the two lenses. To this end, a metal structure (optical chassis, optical bench, etc.) was inserted into them. However, adding the metal structure leads to a problem like increases in size and weight.

SUMMARY OF THE INVENTION

An object of the present invention is to provide an electronic device capable of adjusting the optical alignment of two glasses for both eyes according to a user's physical features, when using the electronic device in virtual reality (VR), augmented reality (AR), mixed reality (MR), etc.

An exemplary embodiment of the present invention provides an electronic device comprising: a first display for the left eye of a user; a second display for the right eye of the user, that is spaced apart from the first display in a one direction; frames that hold the first display and the second display and are supported on the user's head; and an optical variable unit capable of varying the optical alignment of the first display or second display.

The electronic device may further comprise a controller that transmits an image to the first display or second display, wherein the optical variable unit is capable of varying the optical alignment by changing the angle at which an image is transmitted from the controller to the first display or second display.

The controller may have a guide lens for transmitting an image to the displays, the displays each comprising an incidence area positioned close to the end of the guide lens, where the image enters through the guide lens, and a projection area where the image is projected, wherein the optical variable unit may change the relative angle between the guide lens and the displays.

The optical variable unit may change the relative angle in a second direction that connects from the end of the guide lens to the incidence area and in a third direction that connects from the incidence area to the projection area.

The frames may be made of elastic material to deform when the user wears the electronic device, the first display or second display may be configured to change position upon deformation of the frames, and the optical variable unit may correct error in optical alignment which occurs as the first display or second display changes position upon deformation of the frames.

The electronic device may further comprise a sensor for detecting the amount of deviation on the first display or second display.

The electronic device may further comprise a controller that transmits an image to the first display or second display, wherein the controller may determine the degree to which the optical variable unit varies through information provided from the sensor.

The electronic device may further comprise a drive part for driving the optical variable unit, wherein the controller may drive the optical variable unit through the information provided from the sensor.

The sensor may detect a pupil of the user, and the controller may determine the amount of deviation on the first display or second display through the information provided from the sensor and thereby determine the degree to which the optical variable unit varies.

The controller may transmit a stored image to the first display or second display, and the sensor detects the pupil of the user viewing the image.

The controller may transmit the stored image to the first display or second display at a focal length approaching infinity, and determine the amount of deviation on the first display or second display by comparing the user's focal length determined based on the information provided from the sensor and a preset focal length.

The controller may shift an image provided to the first display or second display by driving the optical variable unit.

The first display and the second display each may have a 3D camera, wherein the controller may get an image from the 3D camera and creates stereoscopic image-related information.

The controller may perform image processing by correcting the image from the 3D camera through the information provided from the sensor.

The controller may determine the amount of deviation on the 3D camera through the information provided from the sensor, and perform image processing by shifting the image from the 3D camera by a number of pixels corresponding the amount of deviation on the 3D camera.

Another exemplary embodiment of the present invention provides an electronic device comprising: a first display for the left eye of a user; a first camera provided on the first display; a second display for the right eye of the user, that is spaced apart from the first display in a one direction; a second camera provided on the second display; frames that hold the first display and the second display and are supported on the user's head; and an optical variable unit capable of varying the optical alignment of the first camera or second camera.

Yet another exemplary embodiment of the present invention provides an electronic device comprising: a first display for the left eye of a user; a second display for the right eye of the user, that is spaced apart from the first display in a one direction; frames that hold the first display and the second display and are supported on the user's head; a first sensor for detecting the amount of deviation on the first display; a second sensor for detecting the amount of deviation on the second display; and a controller that transmits an image to the first display or second display and corrects the optical alignment of the first display or second display through information provided from the first sensor and second sensor, wherein the controller may correct the optical alignment by changing the position of the image displayed on the first display or second display.

The controller may transmit a stored image to the first display and second display, the first and second sensors respectively may detect the pupils of the user viewing the image, and the controller may determine the amount of deviation on the first display or second display through the information provided from the sensors and thereby corrects the optical alignment.

The controller may transmit the stored image to the first display and second display at a focal length approaching infinity, and determine the amount of deviation on the first display or second display by comparing the user's focal length determined based on the information provided from the sensor and a preset focal distance 효과부분은  맨뒤로 이동

Figure 20:
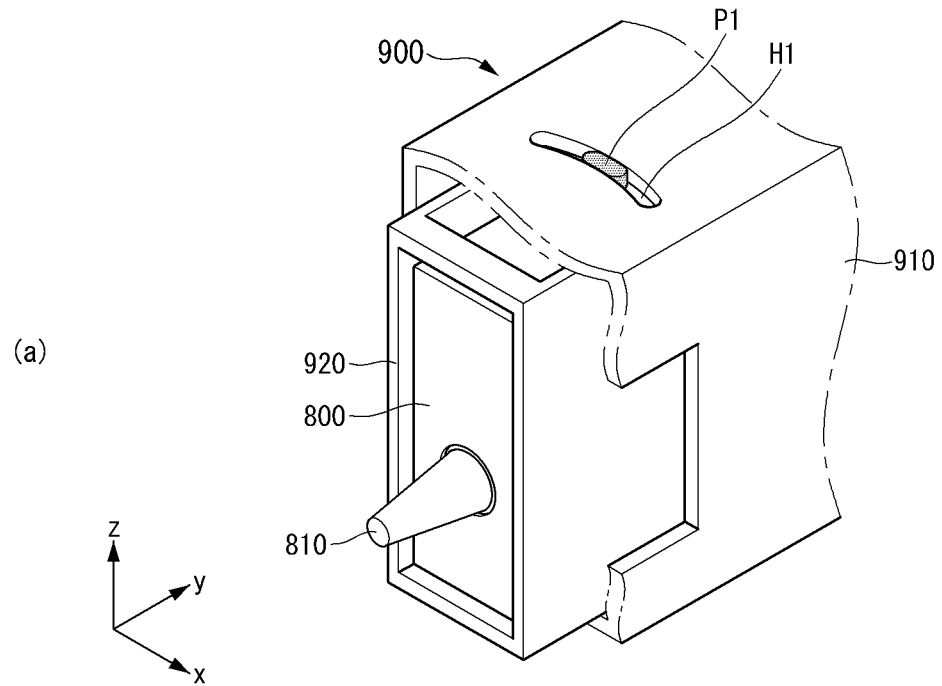
Figure 20:
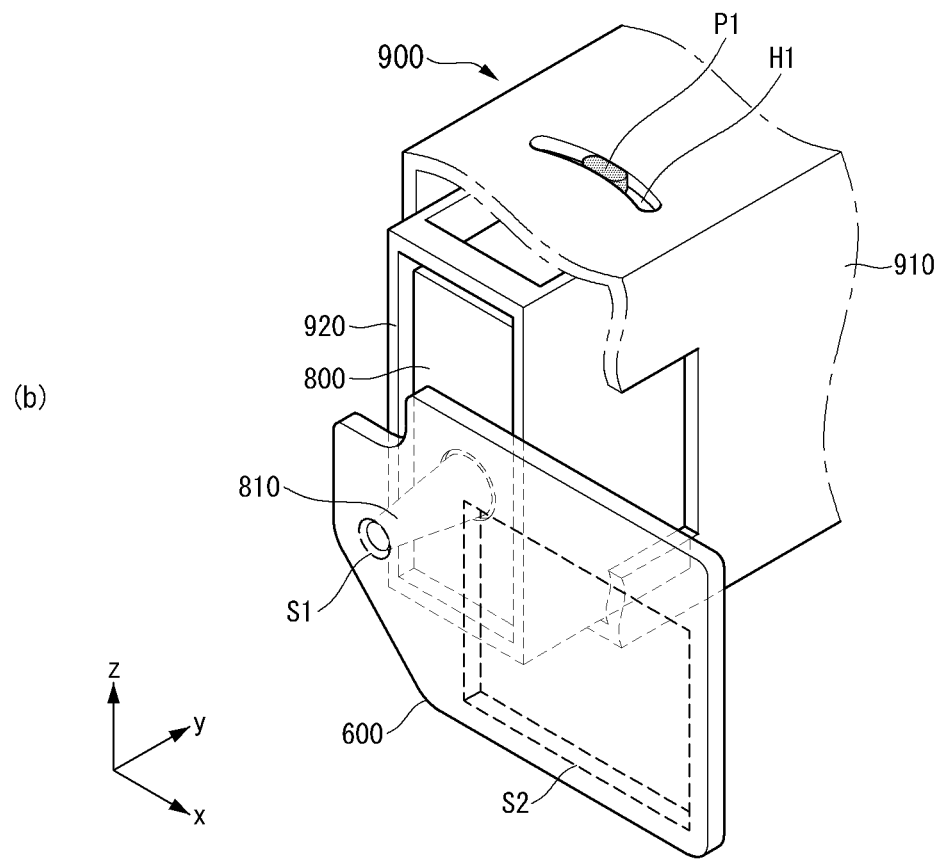

(a) of FIG. 20 illustrates a partial perspective view of an optical variable unit according to a first exemplary embodiment, and (b) of FIG. 20 illustrates a detailed view of a connecting structure of a controller and a display.

Figure 21:
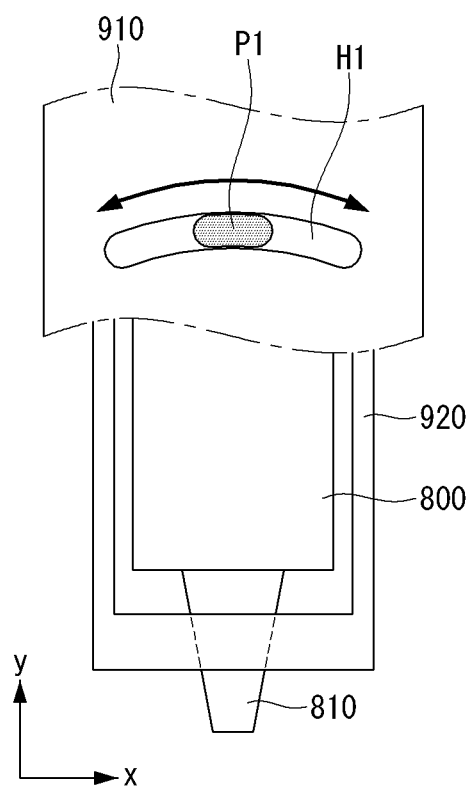

FIG. 21 illustrates the optical variable unit according to the first exemplary embodiment when viewed from above.

Figure 22:
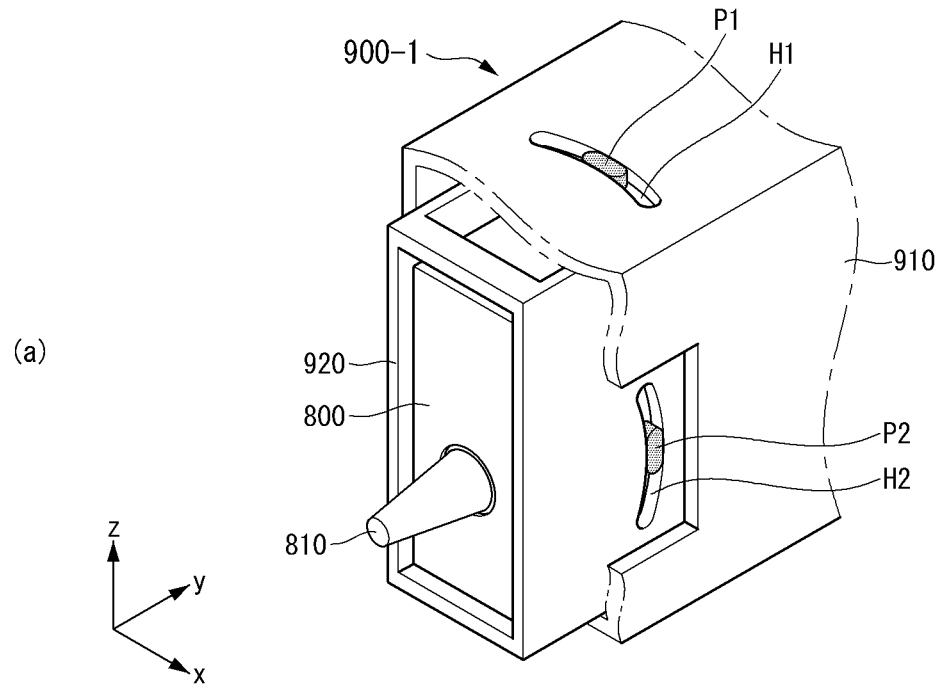
Figure 22:
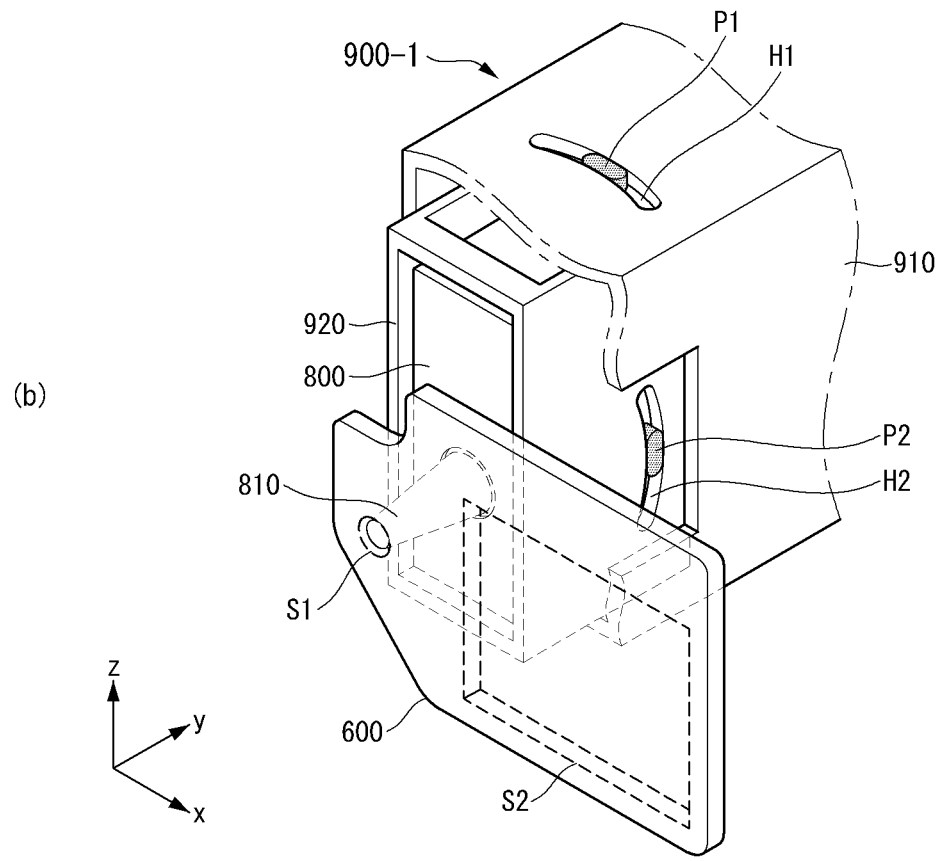

(a) of FIG. 22 illustrates a partial perspective view of an optical variable unit according to a second exemplary embodiment, and (b) of FIG. 22 illustrates a detailed view of a connecting structure of a controller and a display.

Figure 23:
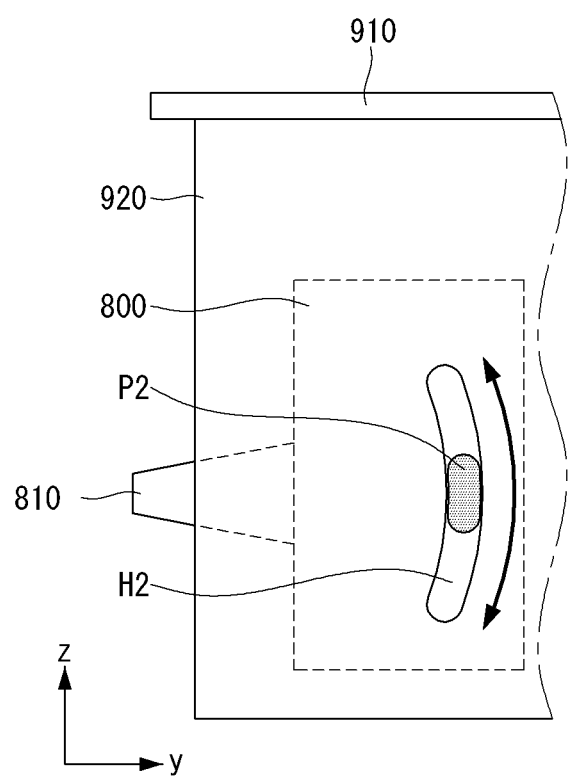

FIG. 23 illustrates the optical variable unit according to the second exemplary embodiment when viewed from the side.

Figure 24:
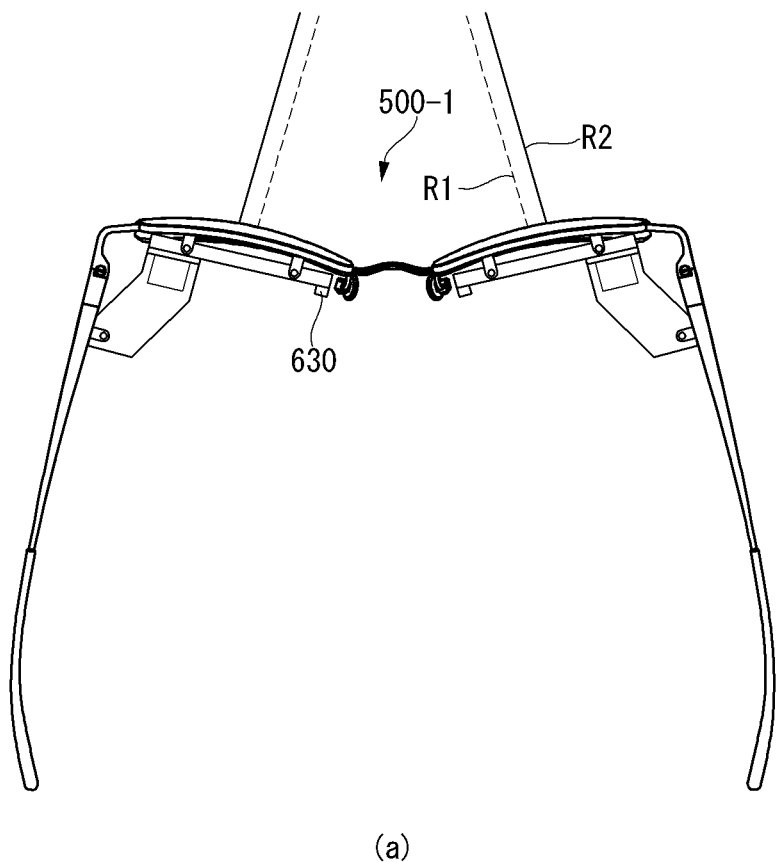
Figure 24:
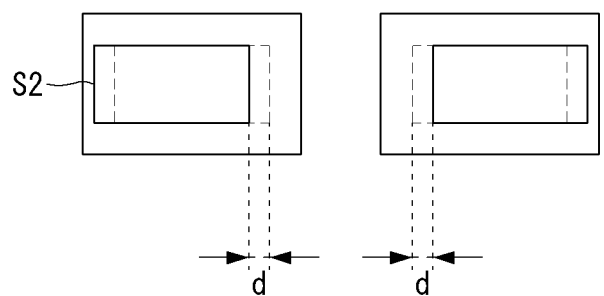

FIG. 24 is a view explaining how display areas are moved by the amount of deviation from alignment.

Figure 25:
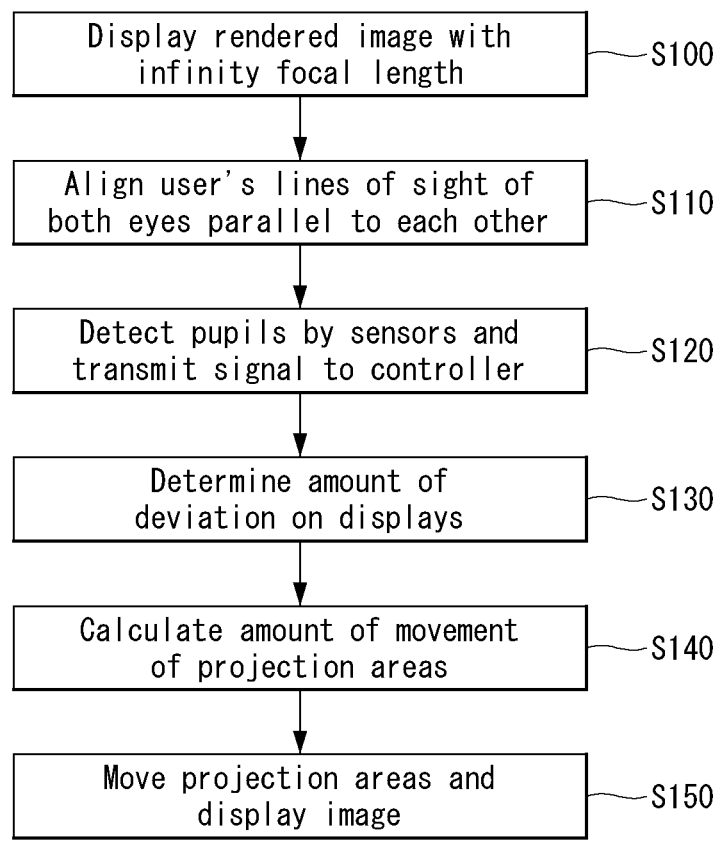

FIG. 25 is a flowchart explaining a method of alignment adjustment in the case of FIG. 24.

Figure 26:
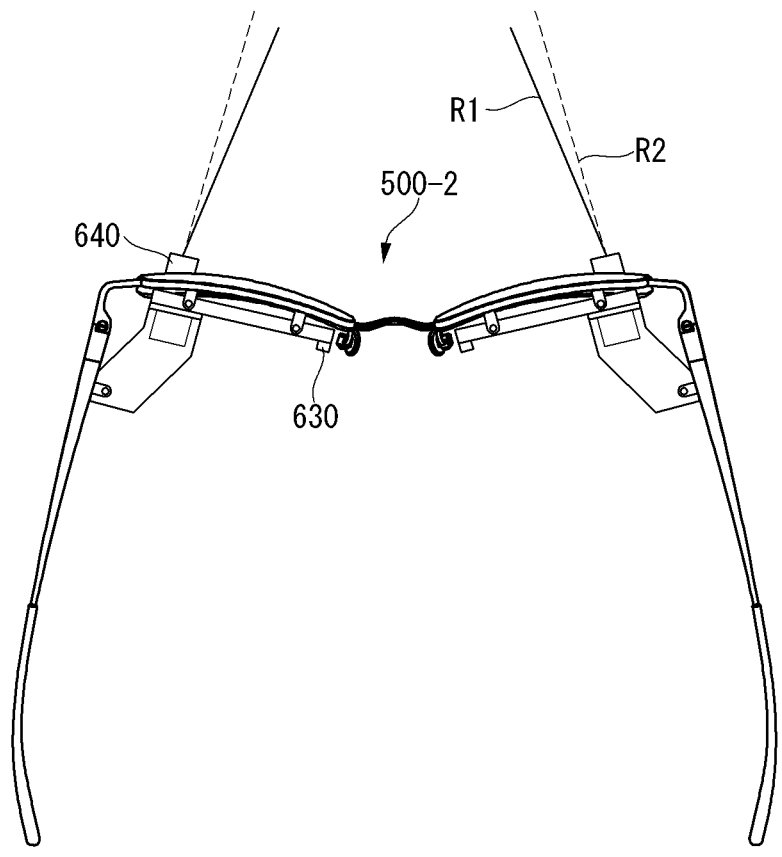
Figure 26:
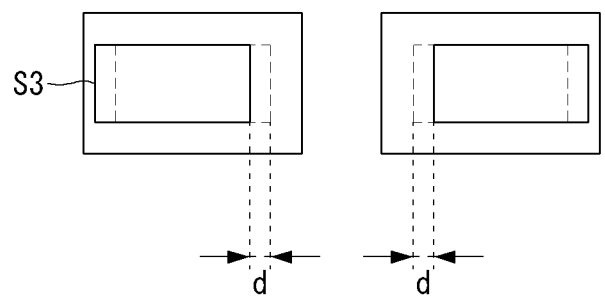

FIG. 26 is a view explaining how 3D camera areas are moved by the amount of deviation from alignment.

Figure 27:
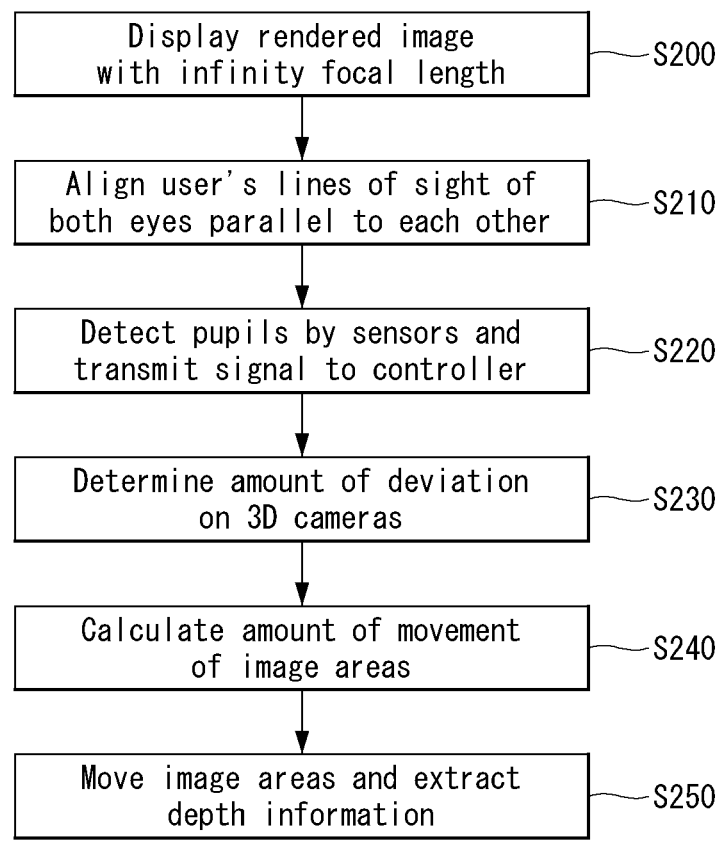

FIG. 27 is a flowchart explaining a method of alignment adjustment in the case of FIG. 26.

DESCRIPTION OF EXEMPLARY EMBODIMENTS

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present invention; rather, it should be understood that the appended drawings include all of the modifications, equivalents or substitutes described by the technical principles and belonging to the technical scope of the present invention.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area. Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present invention to be described below may be implemented by combining or modifying the respective embodiments to satisfy the aforementioned requirements of the 5G system.

Figure 1:
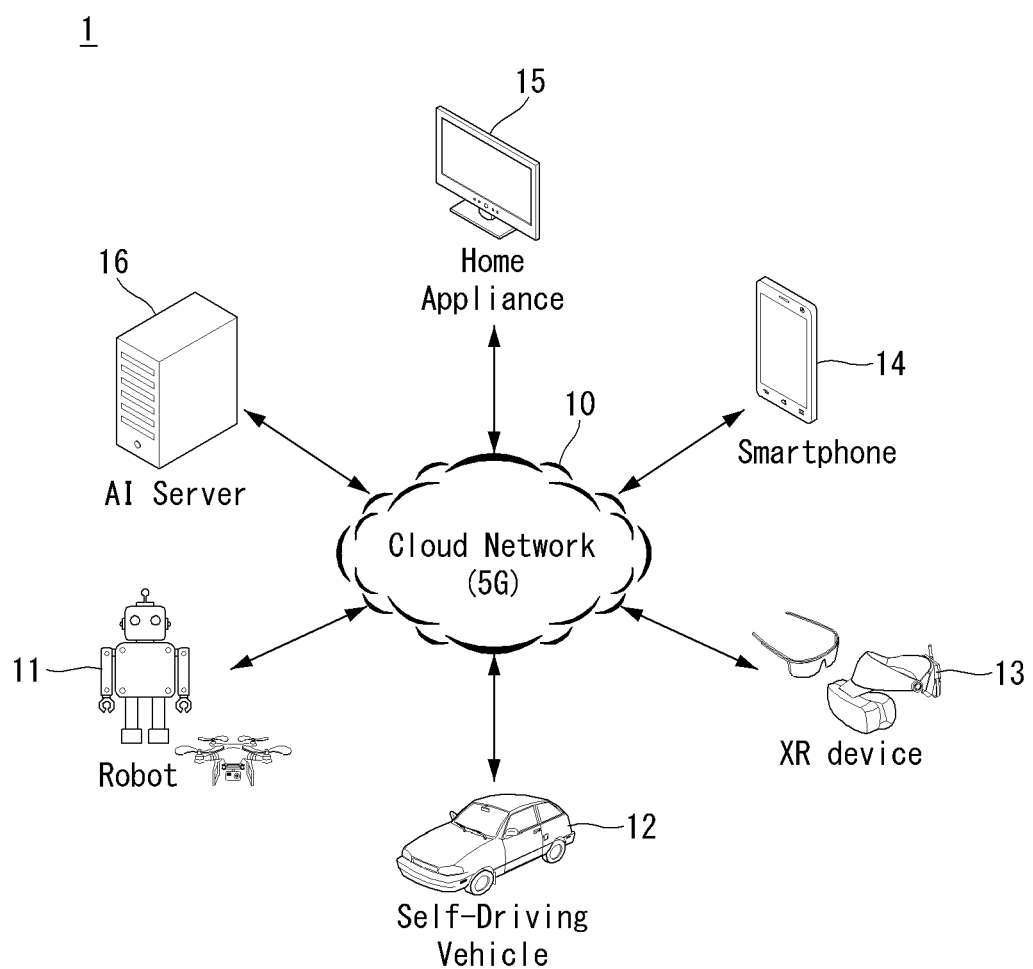
FIG. 1 illustrates one embodiment of an AI device.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to one embodiment of the present invention will be described.

Figure 2:
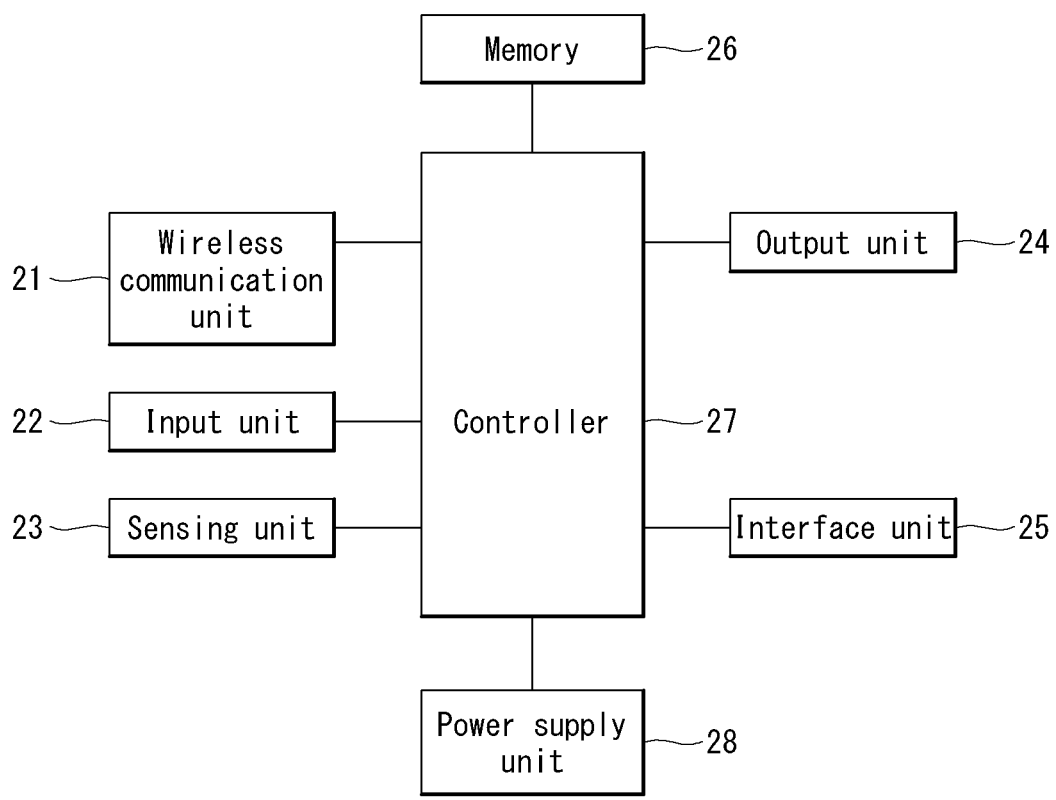
FIG. 2 is a block diagram illustrating the structure of an eXtended Reality (XR) electronic device according to one embodiment of the present invention.

FIG. 2 is a block diagram illustrating the structure of an XR electronic device 20 according to one embodiment of the present invention.

Referring to FIG. 2, the XR electronic device 20 may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display unit, sound output unit, haptic module, and optical output unit. The display unit may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20.

Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present invention will be described with reference to an example where the electronic device is applied to a Head Mounted Display (HMD). However, embodiments of the electronic device according to the present invention may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

Figure 3:
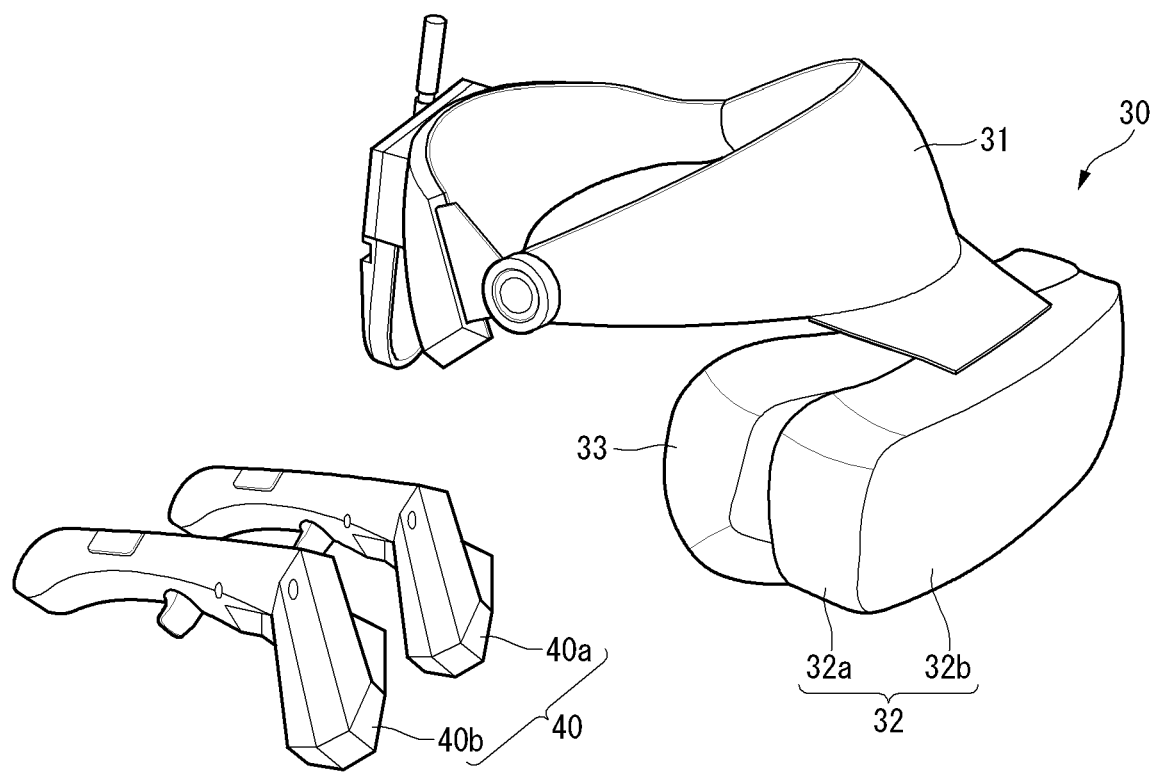
FIG. 3 is a perspective view of a VR electronic device according to one embodiment of the present invention.
Figure 4:
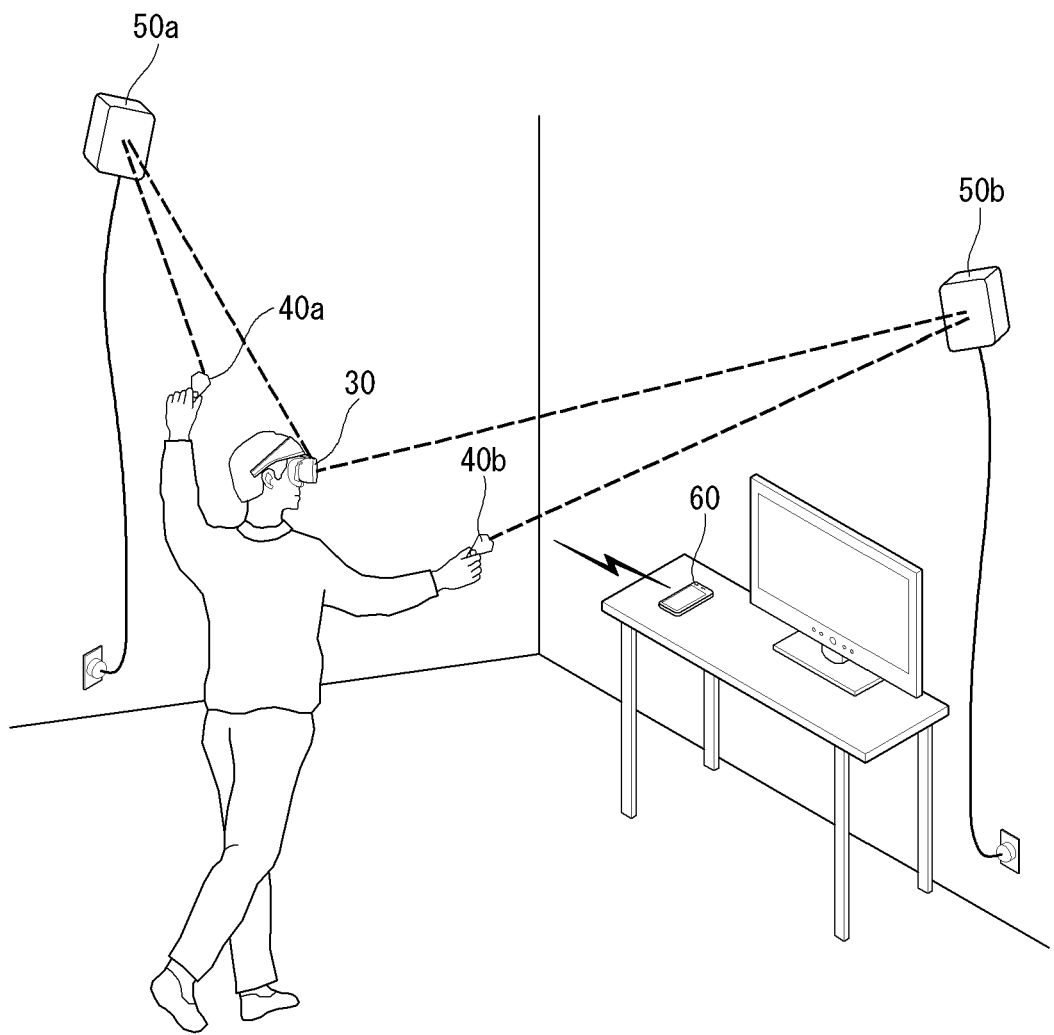
FIG. 4 illustrates a situation in which the VR electronic device of FIG. 3 is used.

FIG. 3 is a perspective view of a VR electronic device according to one embodiment of the present invention, and FIG. 4 illustrates a situation in which the VR electronic device of FIG. 3 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 may also be formed being integrated into the head unit 31.

The head unit 31 may assume a structure of enclosing the head of the user so as to disperse the weight of the display unit 32. And to accommodate different head sizes of users, the head unit 31 may provide a band of variable length.

The display unit 32 includes a cover unit 32a combined with the head unit 31 and a display unit 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display unit 32b is installed on the front surface frame of the cover unit 32a and disposed at the position corresponding to the eyes of the user to display screen information (image or video). The screen information output on the display unit 32b includes not only VR content but also external images collected through an image capture means such as a camera.

And VR content displayed on the display unit 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display unit 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display unit 32b.

The display unit 32b may include a display panel installed at the front of the opening of the cover unit 32a, where the display panel may be an LCD or OLED panel. Similarly, the display unit 32b may be a display unit of a smartphone. In other words, the display unit 32b may have a specific structure in which a smartphone may be attached to or detached from the front of the cover unit 32a.

And an image capture means and various types of sensors may be installed at the front of the display unit 32.

The image capture means (for example, camera) is formed to capture (receive or input) the image of the front and may obtain a real world as seen by the user as an image. One image capture means may be installed at the center of the display unit 32b, or two or more of them may be installed at symmetric positions. When a plurality of image capture means are installed, a stereoscopic image may be obtained. An image combining an external image obtained from an image capture means with a virtual image may be displayed through the display unit 32b.

Various types of sensors may include a gyroscope sensor, motion sensor, or IR sensor. Various types of sensors will be described in more detail later.

At the rear of the display unit 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display unit 32b in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50a, 50b) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present invention. For example, an input device installed in the electronic device 30 may replace the controller 40, and position information may be determined by itself from various sensors installed in the electronic device 30.

Figure 5:
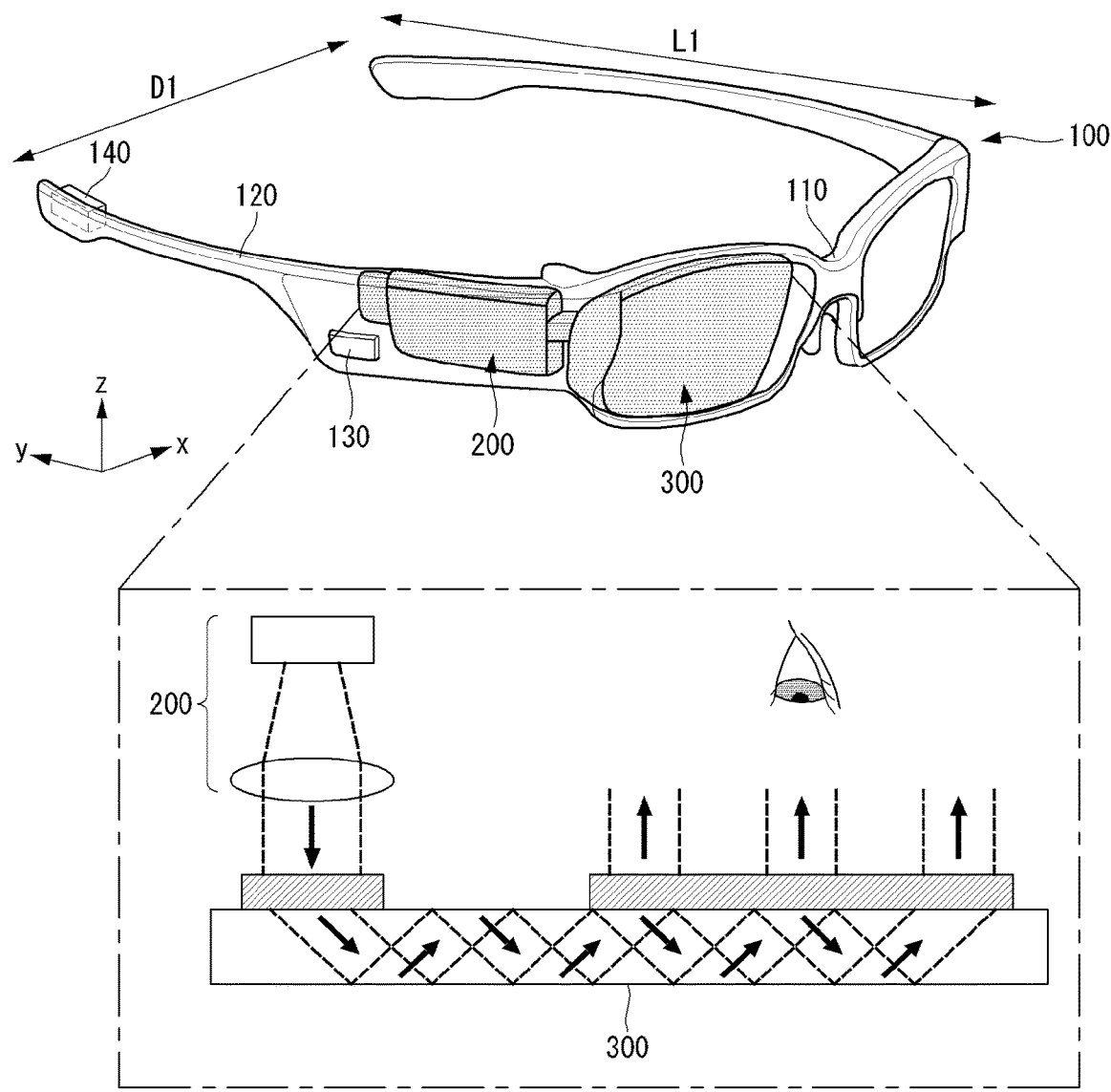
FIG. 5 is a perspective view of an AR electronic device according to one embodiment of the present invention.

FIG. 5 is a perspective view of an AR electronic device according to one embodiment of the present invention.

As shown in FIG. 5, the electronic device according to one embodiment of the present invention may include a frame 100, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present invention is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 5, the electronic device may operate so that if the controller 200 projects light about an image onto one side of the display unit 300, the light is emitted to the other side of the display unit, and the image generated by the controller 200 is shown to the user.

Accordingly, the user may see the image generated by the controller 200 while seeing the external environment simultaneously through the opening of the frame 100. In other words, the image output through the display unit 300 may be seen by being overlapped with a normal view. By using the display characteristic described above, the electronic device may provide an AR experience which shows a virtual image overlapped with a real image or background as a single, interwoven image.

Figure 6:
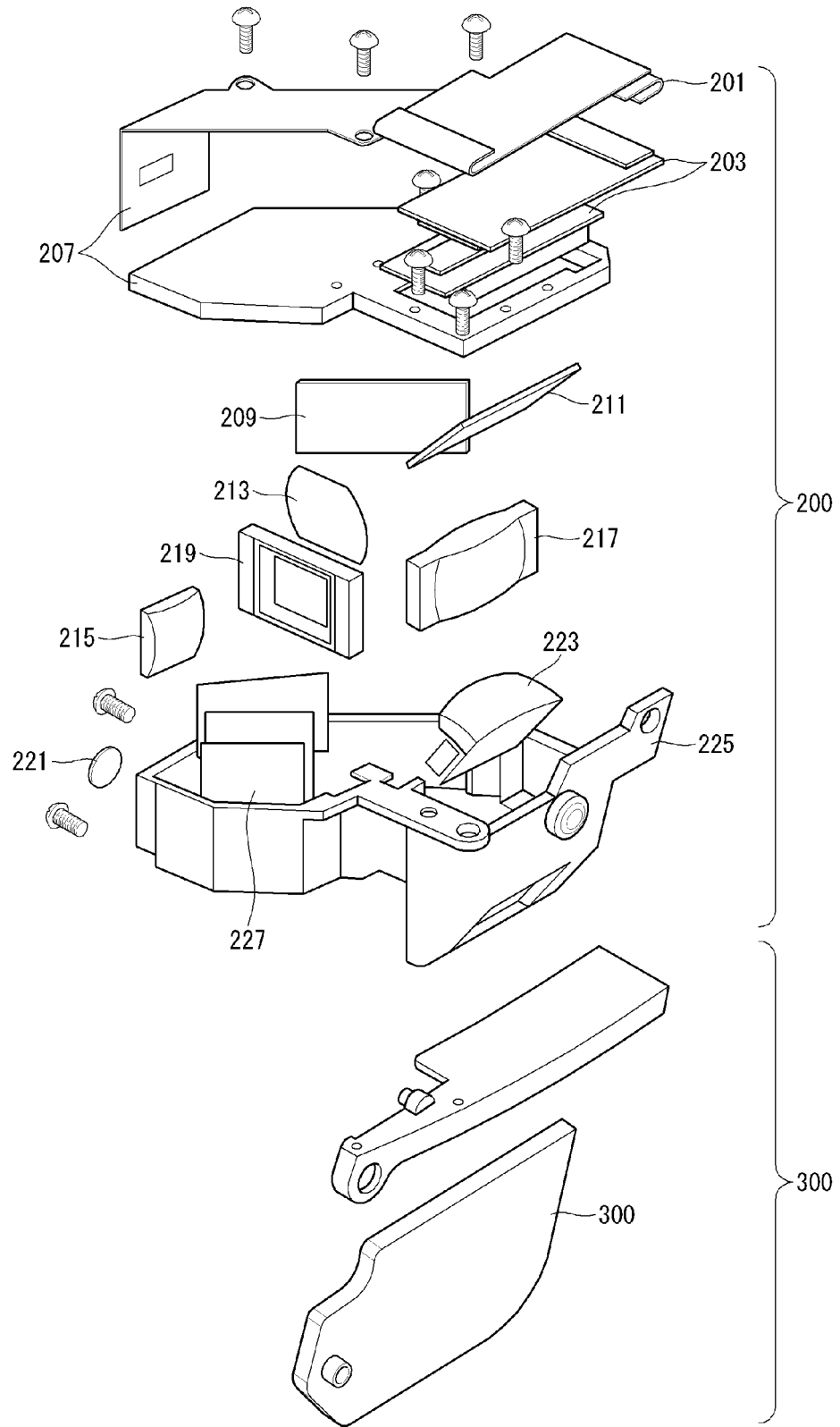
FIG. 6 is an exploded perspective view of a controller according to one embodiment of the present invention.

FIG. 6 is an exploded perspective view of a controller according to one embodiment of the present invention.

Referring to the figure, the controller 200 may include a first cover 207 and second cover 225 for protecting internal constituting elements and forming the external appearance of the controller 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display unit 300.

The display unit 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display unit 300 and various methods for emitting incident image light rays will be described.

FIGS. 7 to 13 illustrate various display methods applicable to the display unit 300 according to one embodiment of the present invention.

Figure 7:
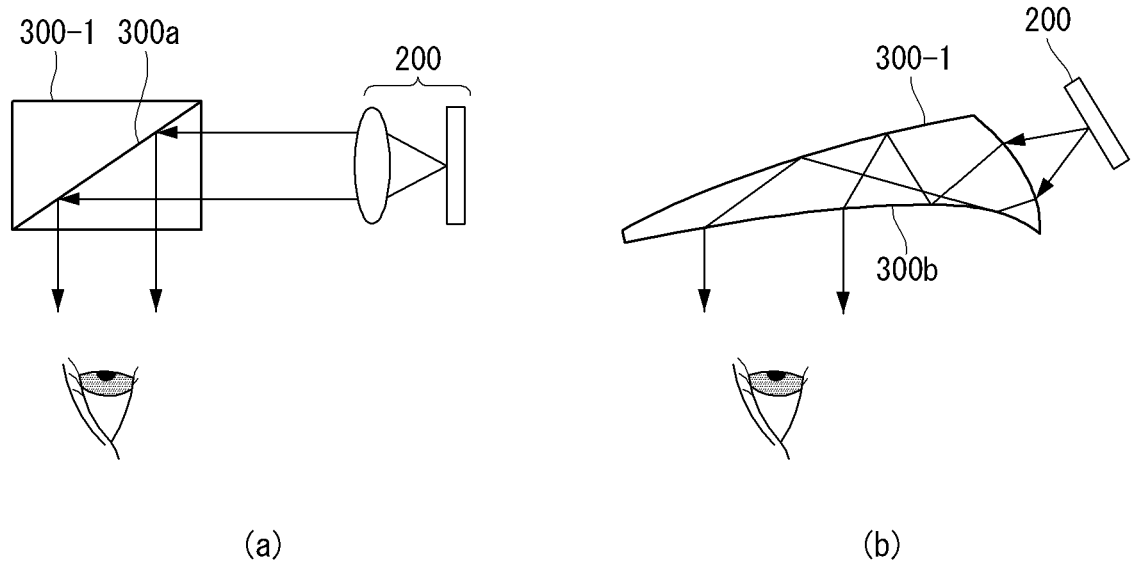
FIGS. 7 to 13 illustrate various display methods applicable to a display unit according to one embodiment of the present invention.
Figure 8:
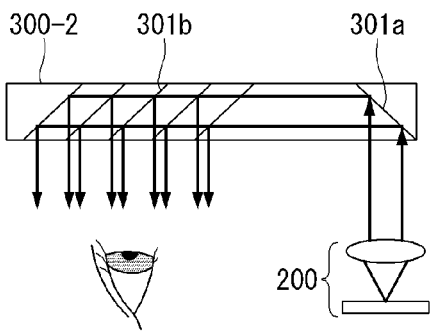
Figure 8:
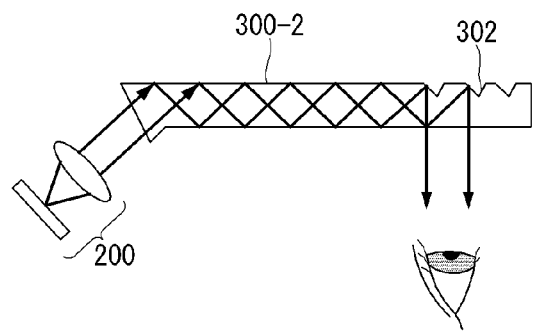
Figure 8:
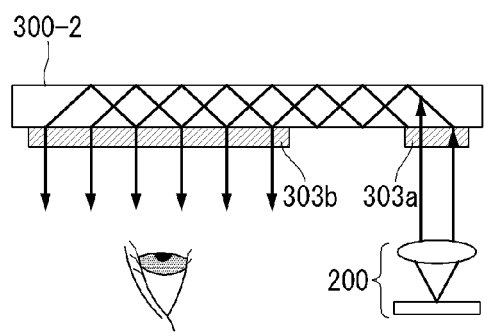
Figure 8:
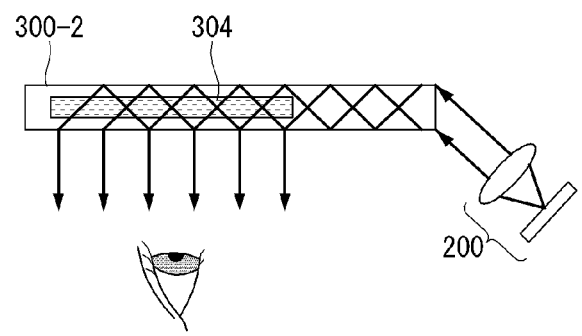
Figure 8:
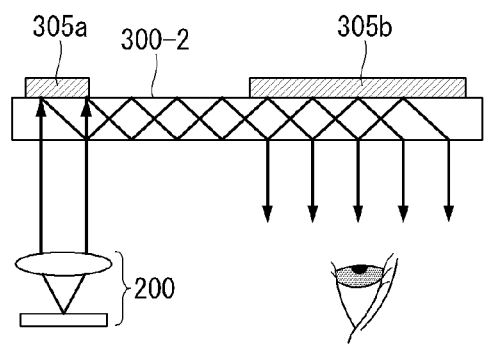
Figure 8:
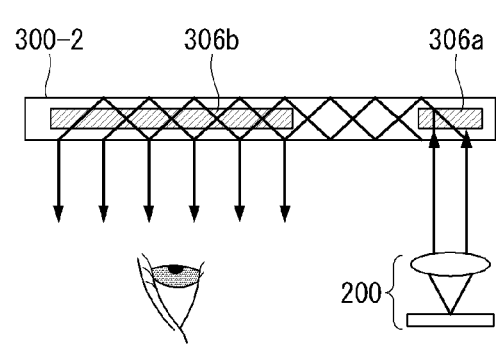
Figure 9:
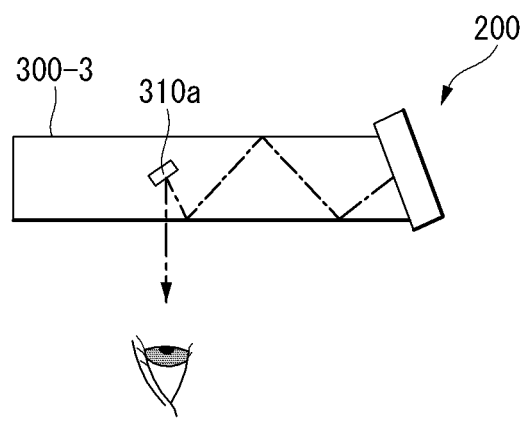
Figure 9:
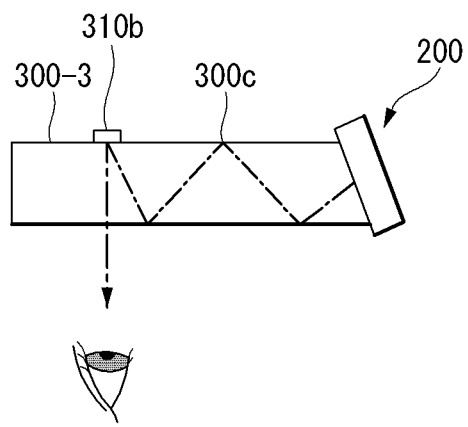
Figure 9:
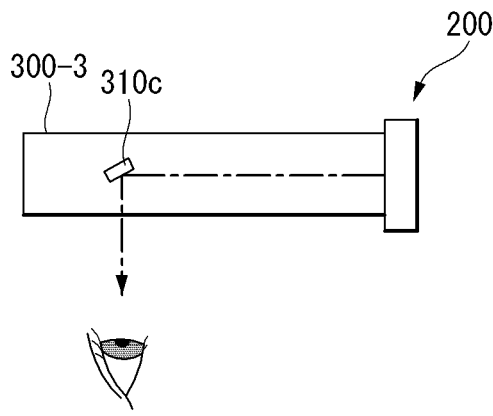
Figure 9:
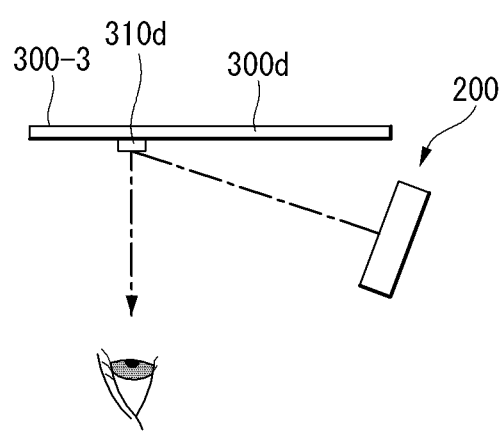
Figure 10:
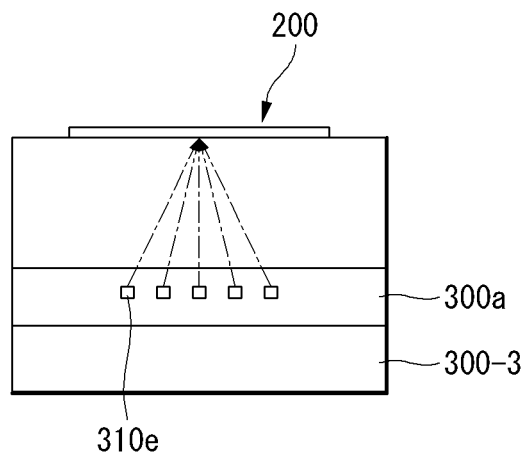
Figure 10:
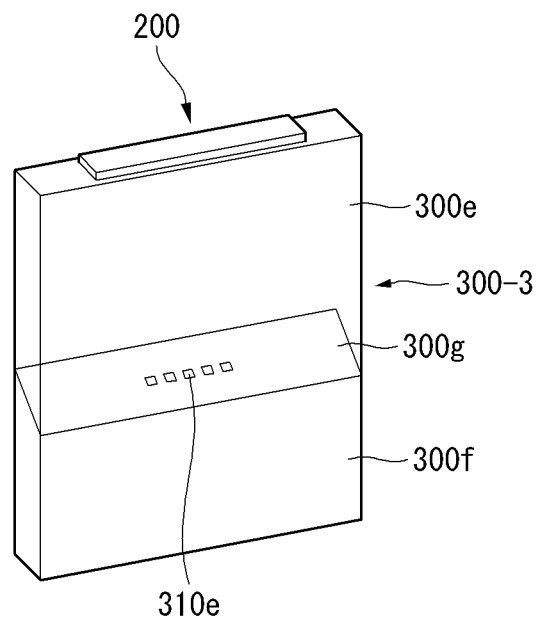
Figure 10:
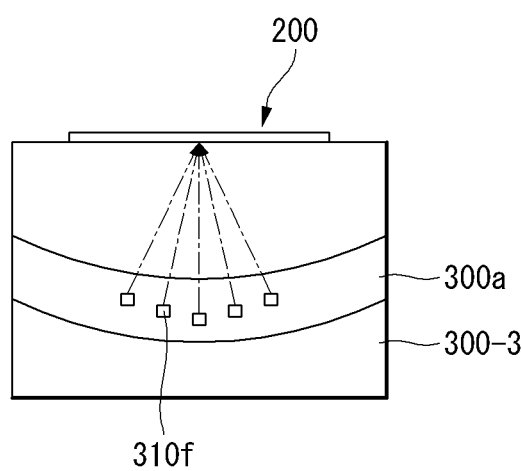
Figure 10:
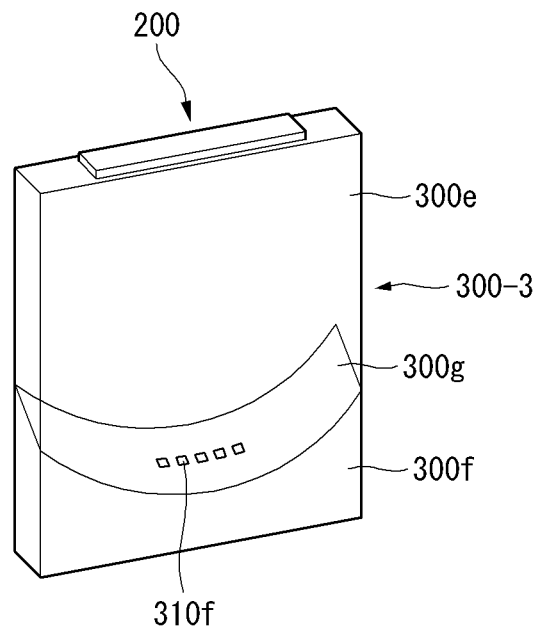
Figure 11:
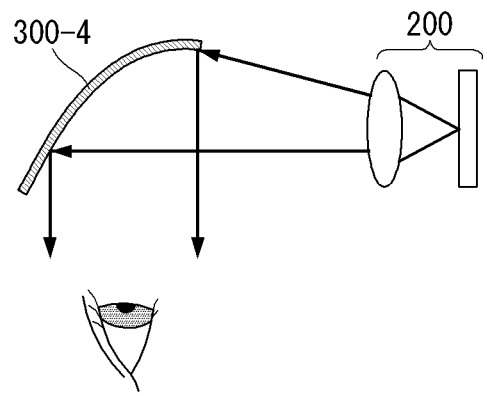
Figure 11:
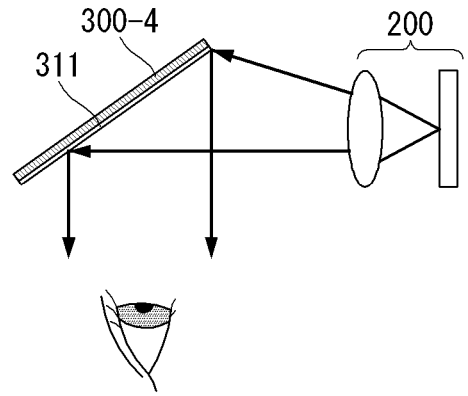
Figure 11:
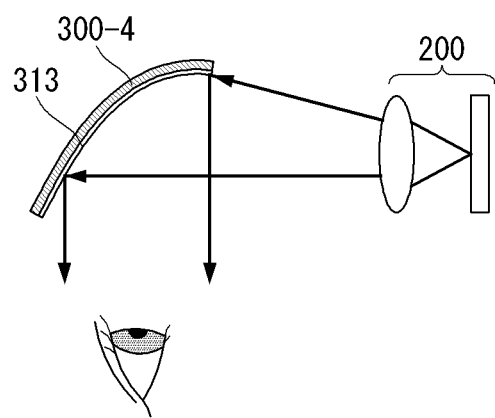
Figure 12:
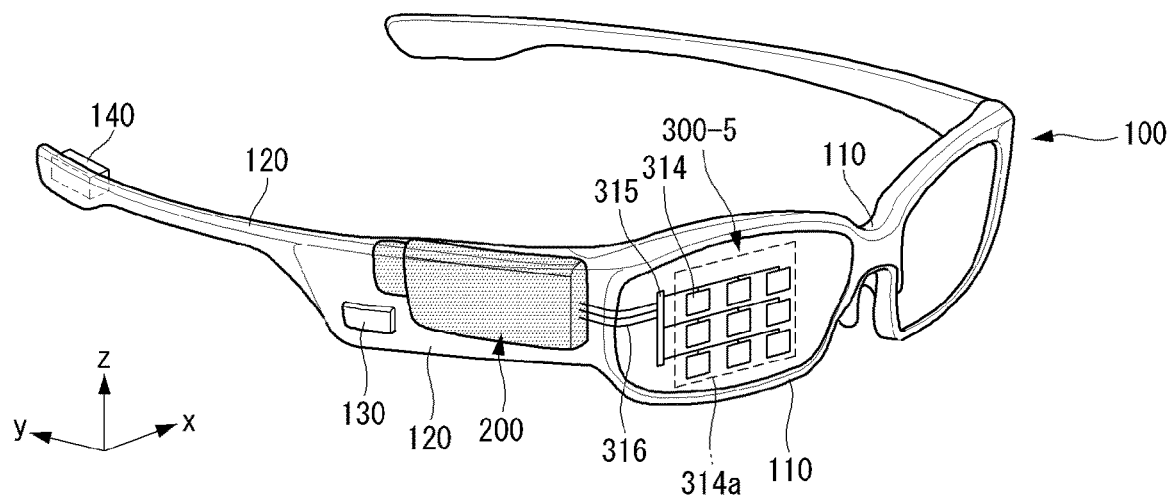
Figure 13:
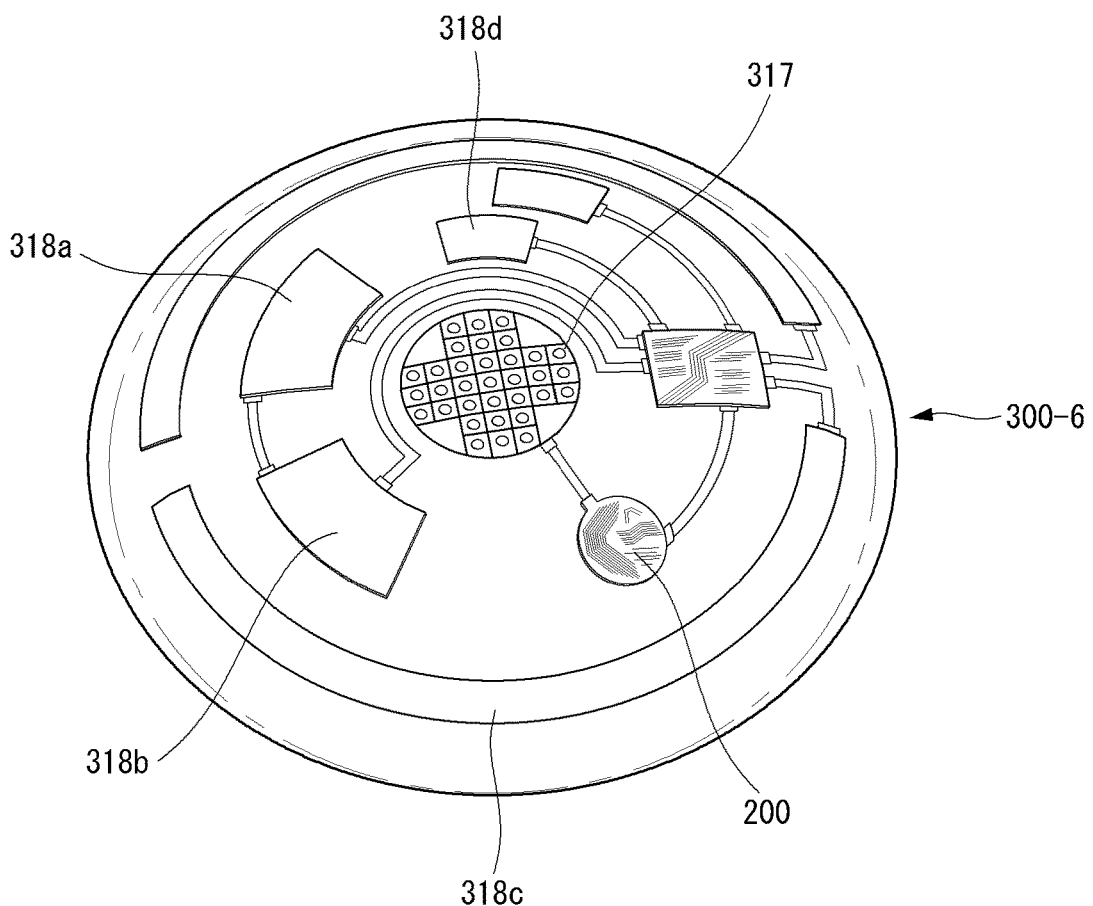

More specifically, FIG. 7 illustrates one embodiment of a prism-type optical element; FIG. 8 illustrates one embodiment of a waveguide-type optical element; FIGS. 9 and 10 illustrate one embodiment of a pin mirror-type optical element; and FIG. 11 illustrates one embodiment of a surface reflection-type optical element. And FIG. 12 illustrates one embodiment of a micro-LED type optical element, and FIG. 13 illustrates one embodiment of a display unit used for contact lenses.

As shown in FIG. 7, the display unit 300-1 according to one embodiment of the present invention may use a prism-type optical element.

In one embodiment, as shown in FIG. 7(a), a prism-type optical element may use a flat-type glass optical element where the surface 300a on which image light rays are incident and from which the image light rays are emitted is planar or as shown in FIG. 7(b), may use a freeform glass optical element where the surface 300b from which the image light rays are emitted is formed by a curved surface without a fixed radius of curvature.

The flat-type glass optical element may receive the image light generated by the controller 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the controller 200 through a side surface having a finite radius of curvature, totally reflects the received image light, and emits the reflected light toward the user.

As shown in FIG. 8, the display unit 300-2 according to another embodiment of the present invention may use a waveguide-type optical element or light guide optical element (LOE).

As one embodiment, the waveguide or light guide-type optical element may be implemented by using a segmented beam splitter-type glass optical element as shown in FIG. 8(a), saw tooth prism-type glass optical element as shown in FIG. 8(b), glass optical element having a diffractive optical element (DOE) as shown in FIG. 8(c), glass optical element having a hologram optical element (HOE) as shown in FIG. 8(d), glass optical element having a passive grating as shown in FIG. 8(e), and glass optical element having an active grating as shown in FIG. 8(f).

As shown in FIG. 8(a), the segmented beam splitter-type glass optical element may have a total reflection mirror 301a where an optical image is incident and a segmented beam splitter 301b where an optical image is emitted.

Accordingly, the optical image generated by the controller 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 8(b), the optical image generated by the controller 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 8(c) may have a first diffraction unit 303a on the surface of the part on which the optical image is incident and a second diffraction unit 303b on the surface of the part from which the optical image is emitted. The first and second diffraction units 303a, 303b may be provided in a way that a specific pattern is patterned on the surface of the glass or a separate diffraction film is attached thereon.

Accordingly, the optical image generated by the controller 200 is diffracted as it is incident through the first diffraction unit 303a, guided along the longitudinal direction of the glass while being totally reflected, emitted through the second diffraction unit 303b, and eventually perceived by the user.

The glass optical element having a Hologram Optical Element (HOE) as shown in FIG. 8(d) may have an out-coupler 304 inside the glass from which an optical image is emitted. Accordingly, the optical image is incoming from the controller 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 8(e) may have an in-coupler 305a on the opposite surface of the glass surface on which the optical image is incident and an out-coupler 305b on the opposite surface of the glass surface from which the optical image is emitted. Here, the in-coupler 305a and the out-coupler 305b may be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 8(f) may have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display unit 300-3 according to another embodiment of the present invention may use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole deepens the depth of field (DOF), which makes the image formed on the retina more vivid.

In what follows, an embodiment for using a pin mirror-type optical element will be described with reference to FIGS. 9 and 10.

Referring to FIG. 9(a), the pinhole mirror 310a may be provided on the path of incident light within the display unit 300-3 and reflect the incident light toward the user's eye. More specifically, the pinhole mirror 310a may be disposed between the front surface (outer surface) and the rear surface (inner surface) of the display unit 300-3, and a method for manufacturing the pinhole mirror will be described again later.

The pinhole mirror 310a may be formed to be smaller than the pupil of the eye and to provide a deep depth of field. Therefore, even if the focal length for viewing a real world through the display unit 300-3 is changed, the user may still clearly see the real world by overlapping an augmented reality image provided by the controller 200 with the image of the real world.

And the display unit 300-3 may provide a path which guides the incident light to the pinhole mirror 310a through internal total reflection.

Referring to FIG. 9(b), the pinhole mirror 310b may be provided on the surface 300c through which light is totally reflected in the display unit 300-3. Here, the pinhole mirror 310b may have the characteristic of a prism that changes the path of external light according to the user's eyes. For example, the pinhole mirror 310b may be fabricated as film-type and attached to the display unit 300-3, in which case the process for manufacturing the pinhole mirror is made easy.

The display unit 300-3 may guide the incident light incoming from the controller 200 through internal total reflection, the light incident by total reflection may be reflected by the pinhole mirror 310b installed on the surface on which external light is incident, and the reflected light may pass through the display unit 300-3 to reach the user's eyes.

Referring to FIG. 9(c), the incident light illuminated by the controller 200 may be reflected by the pinhole mirror 310c directly without internal total reflection within the display unit 300-3 and reach the user's eyes. This structure is convenient for the manufacturing process in that augmented reality may be provided irrespective of the shape of the surface through which external light passes within the display unit 300-3.

Referring to FIG. 9(d), the light illuminated by the controller 200 may reach the user's eyes by being reflected within the display unit 300-3 by the pinhole mirror 310d installed on the surface 300d from which external light is emitted. The controller 200 is configured to illuminate light at the position separated from the surface of the display unit 300-3 in the direction of the rear surface and illuminate light toward the surface 300d from which external light is emitted within the display unit 300-3. The present embodiment may be applied easily when thickness of the display unit 300-3 is not sufficient to accommodate the light illuminated by the controller 200. Also, the present embodiment may be advantageous for manufacturing in that it may be applied irrespective of the surface shape of the display unit 300-3, and the pinhole mirror 310d may be manufactured in a film shape.

Meanwhile, the pinhole mirror 310 may be provided in plural numbers in an array pattern.

FIG. 10 illustrates the shape of a pinhole mirror and structure of an array pattern according to one embodiment of the present invention.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display unit 300-3.

A plurality of pinhole mirrors 310 are disposed in parallel, being separated from each other, to form an array pattern. The array pattern may form a line pattern or lattice pattern.

FIGS. 10(a) and (b) illustrate the Flat Pin Mirror scheme, and FIGS. 10(c) and (d) illustrate the freeform Pin Mirror scheme.

When the pinhole mirror 310 is installed inside the display unit 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 10(a) and (b), a plurality of pinhole mirrors 310e may be disposed side by side along one direction on the inclined surface 300g and continuously display the augmented reality provided by the controller 200 on the image of a real world seen through the display unit 300-3 even if the user moves the pupil of the eye.

And referring to FIGS. 10(c) and (d), the plurality of pinhole mirrors 310f may form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the controller 200 may be matched to each pinhole mirror.

As described above, by disposing a plurality of pinhole arrays 310f along the radial array, the double image problem of augmented reality provided by the controller 200 due to the path difference of light may be resolved.

Similarly, lenses may be attached on the rear surface of the display unit 300-3 to compensate for the path difference of the light reflected from the plurality of pinhole mirrors 310e disposed side by side in a row.

The surface reflection-type optical element that may be applied to the display unit 300-4 according to another embodiment of the present invention may employ the freeform combiner method as shown in FIG. 11(a), Flat HOE method as shown in FIG. 11(b), and freeform HOE method as shown in FIG. 11(c).

The surface reflection-type optical element based on the freeform combiner method as shown in FIG. 11(a) may use freeform combiner glass 300, for which a plurality of flat surfaces having different incidence angles for an optical image are combined to form one glass with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 11(*b*) may have a hologram optical element (HOE) 311 coated or patterned on the surface of flat glass, where an optical image emitted by the controller 200 passes through the HOE 311, reflects from the surface of the glass, again passes through the HOE 311, and is eventually emitted to the user.

The surface reflection-type optical element based on the freeform HOE method as shown in FIG. 11(*c*) may have a HOE 313 coated or patterned on the surface of freeform glass, where the operating principles may be the same as described with reference to FIG. 11(*b*).

In addition, a display unit 300-5 employing micro LED as shown in FIG. 12 and a display unit 300-6 employing a contact lens as shown in FIG. 13 may also be used.

Referring to FIG. 12, the optical element of the display unit 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the controller 200 to correspond to the augmented reality image is transmitted to the display unit 300-5 along a conductive input line 316, and the display unit 300-5 may convert the image signal to light through a plurality of optical elements 314 (for example, microLED) and emits the converted light to the user's eye.

The plurality of optical elements 314 are disposed in a lattice structure (for example, 100×100) to form a display area 314*a*. The user may see the augmented reality through the display area 314*a* within the display unit 300-5. And the plurality of optical elements 314 may be disposed on a transparent substrate.

The image signal generated by the controller 200 is sent to an image split circuit 315 provided at one side of the display unit 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 13, the display unit 300-5 may comprise a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318*a*, battery 318*b*, controller 200, antenna 318*c*, and sensor 318*d* in addition to the optical element 317. For example, the sensor 318*d* may check the blood sugar level in the tear, and the controller 200 may process the signal of the sensor 318*d* and display the blood sugar level in the form of augmented reality through the optical element 317 so that the user may check the blood sugar level in real-time.

As described above, the display unit 300 according to one embodiment of the present invention may be implemented by using one of the prism-type optical element, waveguide-type optical element, light guide optical element (LOE), pin mirror-type optical element, or surface reflection-type optical element. In addition to the above, an optical element that may be applied to the display unit 300 according to one embodiment of the present invention may include a retina scan method.

Hereinafter, an electronic device 500 according to an exemplary embodiment of the present invention will be described with reference to FIG. 14 and onwards.

The electronic device 500 according to the exemplary embodiment of the present invention is applicable to binocular glasses or goggles using various types of optics, such as diffractive optical elements (DOE), holographic optical elements (HOE), combiners, prisms, pin mirrors, and cascaded mirrors.

Figure 14:
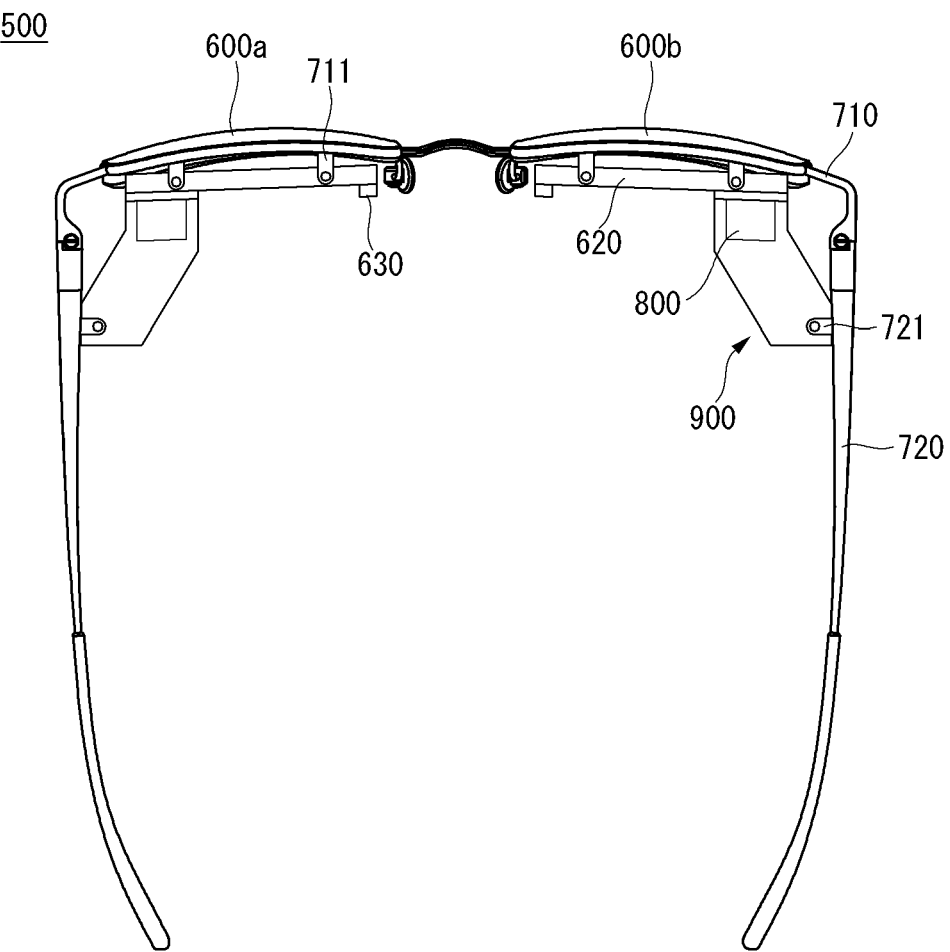
FIG. 14 is a plan view for explaining an extended reality electronic device according to an exemplary embodiment of the present invention.
Figure 15:
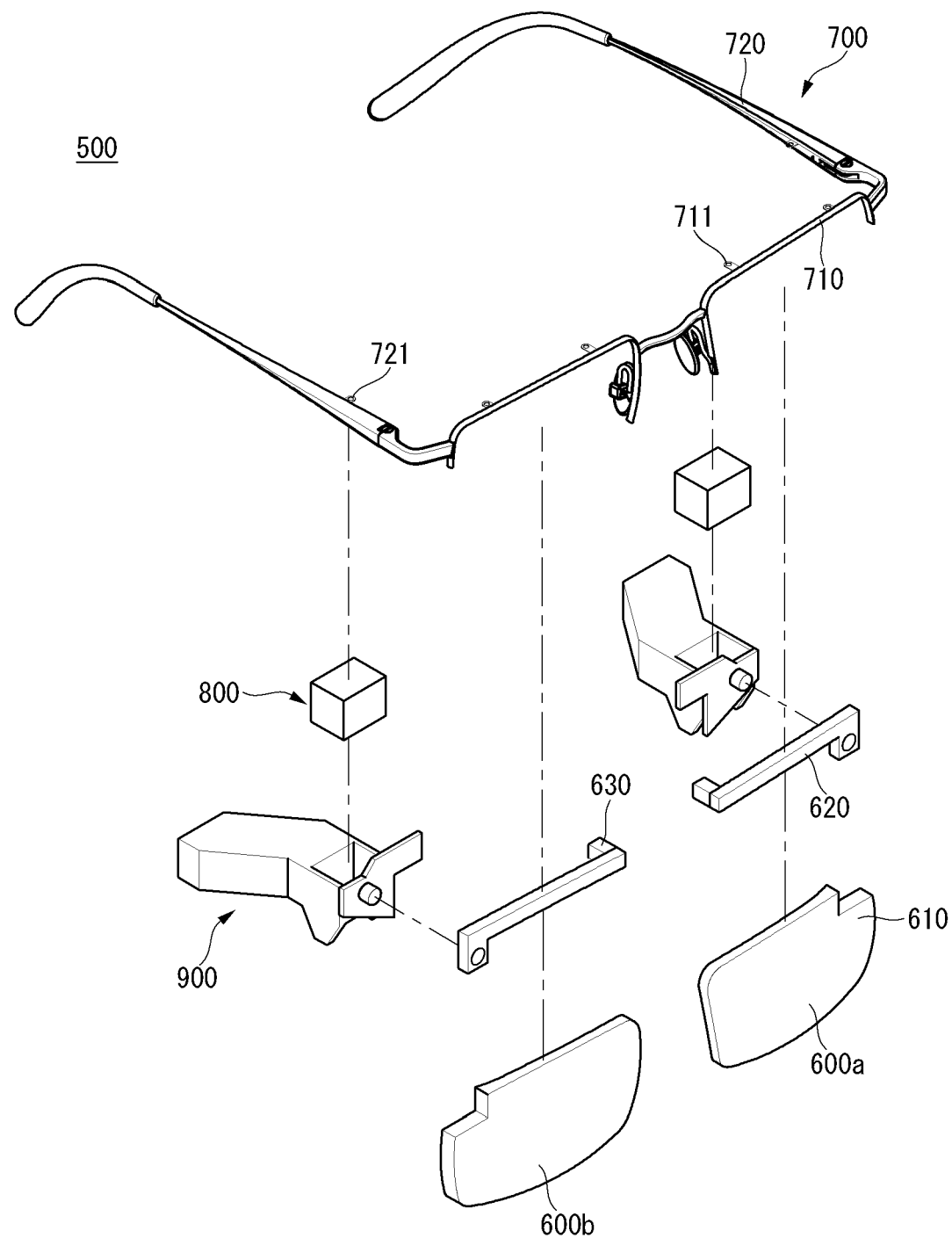
FIG. 15 is an exploded perspective view of the extended reality electronic device according to the exemplary embodiment of the present invention.

FIG. 14 is a plan view for explaining an extended reality electronic device 500 according to an exemplary embodiment of the present invention. FIG. 15 is an exploded perspective view of the extended reality electronic device 500.

Referring to the drawing, the extended reality electronic device 500 according to the exemplary embodiment of the present invention comprises a left-eye display 600*a* for the user's left eye, a right-eye display 600*b* for the user's right eye, frames 700 holding the two displays 600 (600*a* and 600*b*) and supported on the user's head, and a controller 800 for creating and transmitting an image to display it on the displays 600.

The displays 600 may let the user to visually perceive an outside environment and at the same time to see an image created by the controllers 800. Also, the displays 600 may be light transmissive so as to make a projected image and a forward field of view (the extent of the user's vision seen through their eyes) visible at the same time. For example, the displays 600 may be semi-transparent, and may formed of optical elements including glasses 610. As used herein, being semi-transparent means allowing outside light to pass through, enabling the user to see the outside real world and displaying an image transmitted from the controller 800 on glasses 610. Alternatively, the displays 600 may be described as being selectively semi-transparent, which means that the displays 600 are fully transparent if there is no signal from the controller 800 and that only portions of the displays 600 corresponding to an image become semi-transparent when there is a signal from the controller 800.

In the electronic device 500, when the controller 800 allows image light for an image to fall on one side of the displays 600, the image light is projected on the other side of the displays 600, enabling the user to see an image created by the controller 800.

Accordingly, the user is able to see the outside environment through the displays 600 and at the same time see the image created by the controller 800. That is, the image outputted through the displays 600 and the general field of view may appear to overlap. Using this display characteristic, the electronic device 500 may offer augmented reality (AR) by combing a real-world image or background image with a virtual image to create a single image.

The displays 600 are provided in a pair 600*a* and 600*b* for the left and right eyes. A display 600 for either the left or right eye will be enough to serve as a flat display, whereas a pair of displays 600*a* and 600*b* for the left and right eyes will be required to provide a stereoscopic image or an image with a sense of distance.

Moreover, the displays 600 may comprise glasses 610 and glass holding members 620 that fix the glasses 610 constituting the lenses to the frames 700. The drawing depicts an exemplary embodiment in which the glasses 610 are disposed below the frames 700, the frames 700 are affixed to one side of the glass holding members 620, and the glasses 610 are disposed on the other side of the glass holding members 620. In contrast, the glass holding members 620 may be formed integrally with the frames 700, such as by configuring the frames 700 to surround the glasses 610.

While the drawing depicts a pair of eyeglass-type glasses 610 for the left and right eyes, the glasses for the left and right eyes may be integrated like goggles. In this case, a single glass may be provided with a pair of displays for both eyes.

Besides, the description of the displays 300 explained with reference to FIG. 5 will be substituted for a description of the displays 600.

The frames 700 may comprise a front frame 710 extending to the left and right of the user (or in a first direction), where the displays 600 are affixed and a pair of side frames 720 extending rearward from either end of the front frame 710, which are worn over the user's ears.

The front frame 710 may comprise two wires supporting the display 600a for the left eye and the display 600b for the right eye, respectively, and a bridge connecting the two wires. The front frame 710 may further comprise bends which bend down so that the side frames 720 on either side are connected to them.

Alternatively, the two wires of the front frame 710 holding the two displays 600a and 600b may be formed in an integrated manner, unlike in the drawing. In this case, the front frame 710 may be ergonomically designed, including the shape of a curve that bulges forward.

The side frames 720 are designed to be worn over the upper parts of the user's ears, and allow more area to be held against the ears, with their curved shape causing the rear ends to bend down. Moreover, the side frames 720 may be ergonomically designed, including the shape of a curve that bulges outward. In addition, the side frames 720 may be made of elastic material, thus making them wearable even if the user's head width is changed and delivering a comfortable fit.

The front frame 710 and the side frames 720 may be hinged together so that they can rotate. The hinge structure provides an aesthetic look and allows the side frames 720 to be folded inward from the front frame 710, thereby making them smaller in volume for storage.

Alternatively, the front frame 710 and the side frames 720 may be formed in an integrated manner. For example, the frames 700 may be made of elastic material in an integrated manner, and may be divided into the front frame 710 and the side frames 720 as it is bent during processing. By forming the frames 700 in an integrated manner, they can be made more lightweight and have better elasticity, thereby achieving higher durability. Moreover, portions connecting the front frame 710 and the side frames 720 are integrated together and maintain their elasticity, allowing them to be firmly held against a user whose head size is different (larger or smaller) than a standard size.

Referring to the drawings, the front frame 710 comprises first affixing portions 711 where the glass holding members 620 are affixed, and the side frames 720 may comprise second affixing portions 721 where the controller 800 is affixed.

Besides, the description of the frames 100 explained with reference to FIG. 5 will be substituted for a description of the frames 700.

Figure 16:
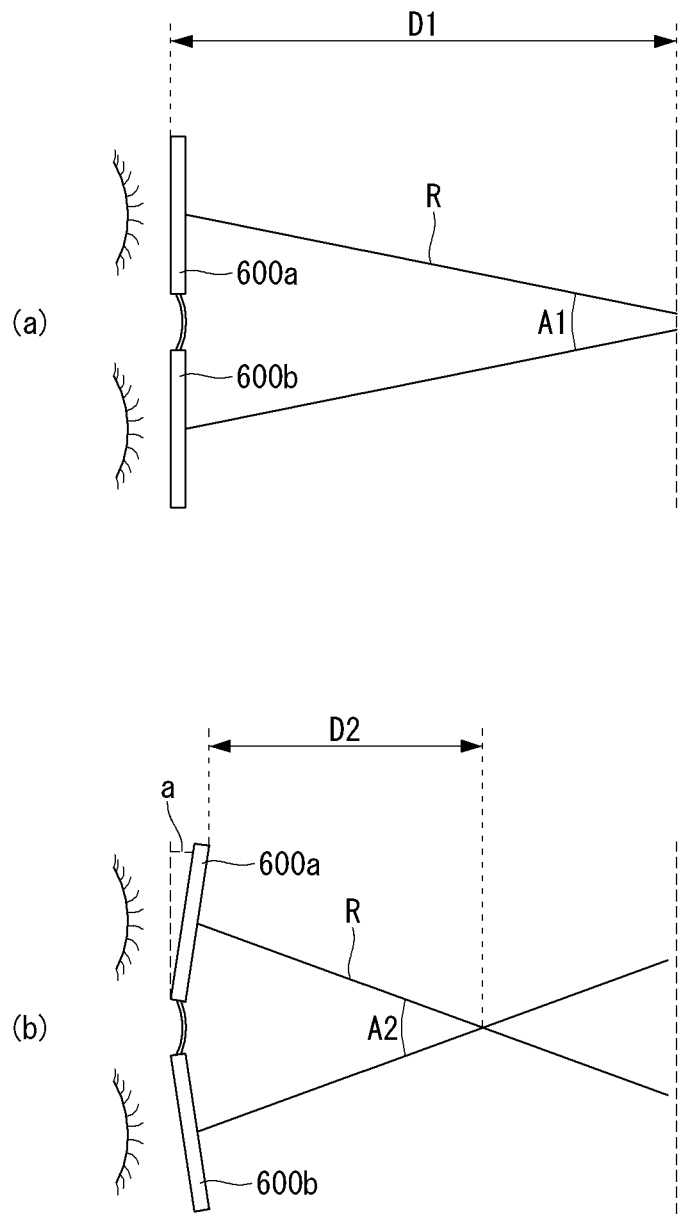
FIG. 16 is a drawing for explaining convergence distance and convergence angle.

FIG. 16 is a drawing for explaining convergence distance and convergence angle.

FIG. 16 depicts the convergence distance D and convergence angle A of a virtual image seen through a pair of displays 600a and 600b for both eyes. The pair of displays 600a and 600b for the left and right eyes each have a light path R along which a virtual image is projected, and the distance at which the light paths R for both eyes converge is referred to as convergence distance, and the angle between the two light paths R is referred to as convergence angle.

As shown in (a) of FIG. 16, the pair of displays 600a and 600b have a convergence distance D1 and convergence angle A1 which are set to correspond to a focal length at which the user views the real-world environment. However, as shown in (b) of FIG. 16, if the angle at which the two displays 600a and 600b are affixed changes, the light paths R are changed by that amount, resulting in a change in the convergence distance D2 and convergence angle A2. For example, for a user whose head width is larger than a standard size, if the two displays 600a and 600b are tilted at the angle a in the direction of convergence, the light paths are changed by the angle a, in which case the convergence distance D2 becomes shorter and the convergence angle A2 becomes wider.

Figure 17:
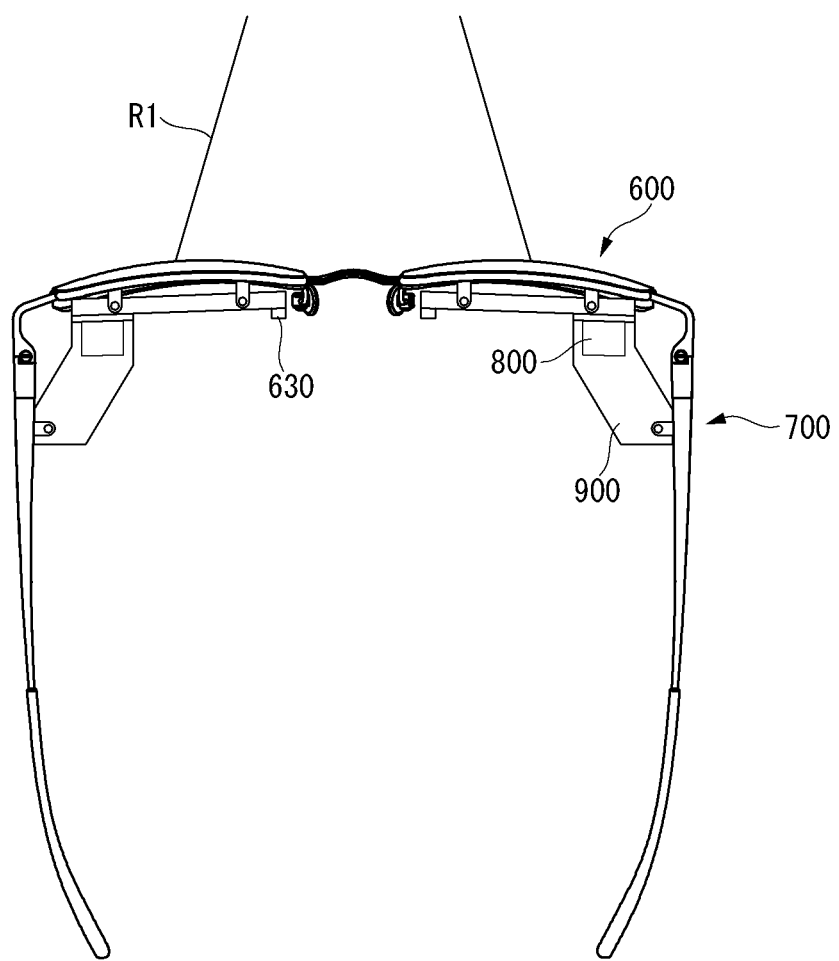
FIG. 17 shows an electronic device in optical alignment.
Figure 18:
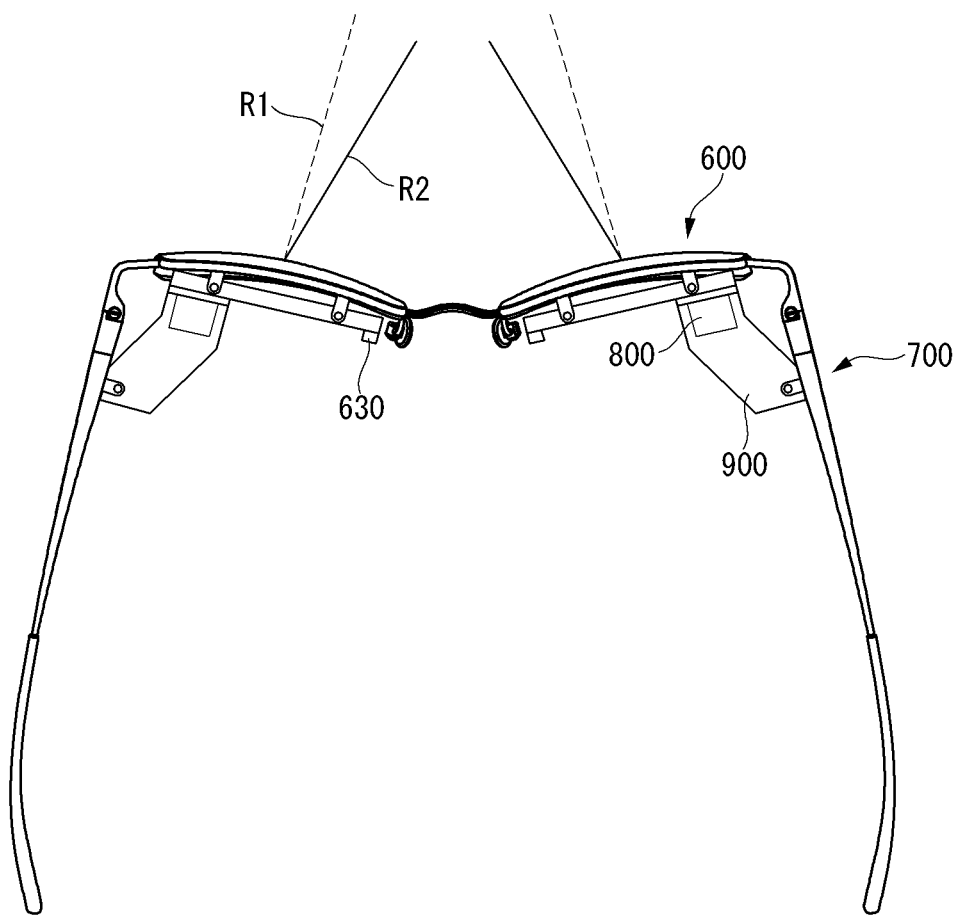
FIG. 18 is a plan view showing a deviation in optical alignment caused when the user wears the electronic device.
Figure 19:
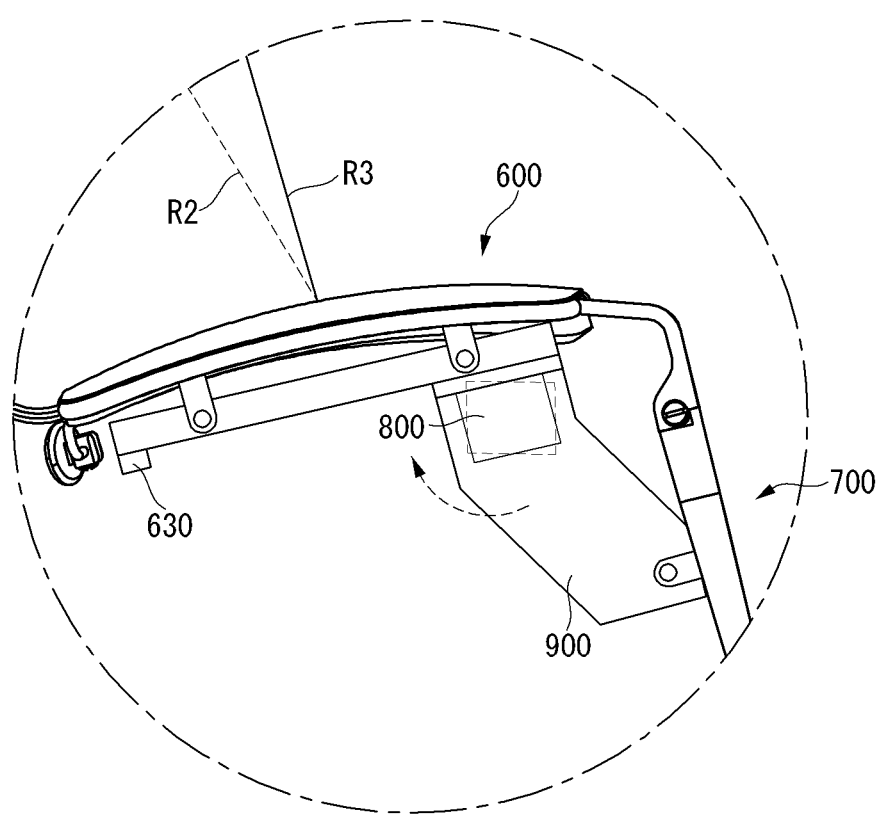
FIG. 19 is an enlarged view of how the alignment is adjusted by rotating the controller.

FIG. 17 shows the electronic device in optical alignment. FIG. 18 is a plan view showing a deviation in optical alignment caused when the user wears the electronic device. FIG. 19 is an enlarged view of how the alignment is adjusted by rotating the controller 800.

Referring to FIG. 17, the optical alignment of the left-eye display 600a and right-eye display 600b may be important for the displays 600 having a binocular optical configuration for the user's left and right eyes.

In the electronic device 500, optical alignment is adjusted by setting the light projection path R1 and the convergence distance or focal distance relative to the average inter-pupillary distance of various users. The convergence angle A (see FIG. 16) between the default IPD and the convergence distance D is set to a given value, and the controller 800 transmits an image signal to the display 600a for the left eye and the display 600b for the right eye based on the convergence angle A).

However, if the IPD changes or the paths R1 of light projected on the displays 600 deviate, the convergence distance D also changes with the convergence angle A. Thus, no image is projected on the displays 600, which may lead to image overlap or blur.

The IPD does not change under the assumption that the distance between the glasses 610 for both eyes is constant. However, the frames 700 have elasticity to suit various facial shapes and sizes (widths) of users, as described above. Due to this, if different users with different physical conditions wear the electronic device 500, the frames 700 may bulge or deform, causing a deviation in the angle between the pair of glasses 610 for both eyes.

For example, referring to FIG. 18, if a user whose head is wider than a standard size wears the electronic device 500, stress is applied to the front frame 710 as the side frames 720 bulge, thereby causing deformation of the front frame 710. Accordingly, the positions of the displays 600 fixed to the front frame 710 are changed.

Moreover, the light projection paths R2 are changed as the angle between the glasses 610 for both eyes changes, and, as a result, the convergence angle A becomes wider.

Therefore, the distance D2 at which the light paths converge from the center of the glasses 610 for both eyes become shorter than the preset distance D1, thus leading to a failure to render a sharp image.

Referring to FIG. 19, the electronic device 500 according to the exemplary embodiment of the present invention may change the path R3 of light projected on the display 600 by using an optical variable unit 900. The light R3 of light projected on the display 600 depends on the path of light incident on the display 600 from the controller 800. Accordingly, even if the angle between the glasses 610 changes, the path R3 of light projected on the display 600 may be changed by varying the path of light transmitted to the display 600 from the controller 800.

The optical variable unit 900 may change the angle at which the controller 800 and the display 600 are affixed, in order to change the path of light incident on the display 600 from the controller 800.

Alternatively, the optical variable unit 900 may change the convergence distance D of an image projected on the display 600 by changing the path of light transmitted to the display 600 from the controller 800.

Moreover, the electronic device 500 may further comprise sensors 630 for detecting the amount of deviation on the displays 600.

The sensors 630 may be installed on the displays 600 and detect the angle between the displays 600. For example, the sensors 630 may be eye tracking sensors. The eye tracking sensors 630 may detect the user's pupils and detect the amount (angle) of deviation on the displays 600 based on the pupils. Also, information detected by the sensors 630 may be transmitted to the controller 800, and the controller 800 may send a tilting command to the optical variable units 900.

Referring to the drawings, the eye tracking sensors 630 may be positioned on the inside of the glass holding members 620. As opposed to the drawings, the sensors 630 may be formed integrally with the glasses 610, or may be provided as detachable unit. Also, their positions may differ depending on the type of the sensors 630.

Moreover, the sensors 630 may be respectively provided in the displays 600a and 600b for both eyes. In a case where the user's face is asymmetrical or has crossed eyes, the amount of deviation from alignment may differ for the left and right eyes when determining the amount of deviation from alignment. In this case, the sensors 630 respectively provided in the displays 600a and 600 for both eyes may individually detect the amount of deviation, and the controller 800 may drive the left and right optical variable units 900 differently and individually according to signals from the sensors 630.

Next, the controller 800 and the optical variable unit 900 will be described in detail with reference to FIGS. 20 and 21.

(a) of FIG. 20 illustrates a partial perspective view of an optical variable unit 900 according to a first exemplary embodiment of the present invention, and (b) of FIG. 20 illustrates a detailed view of a connecting structure of a controller 800 and a display 600. FIG. 21 illustrates the optical variable unit 900 shown in FIG. 20 when viewed from above.

Although the drawings show an example in which the optical variable unit 900 has a guide lens 810 for transmitting an image created by the controller 800 to the display 600, the guide lens 810 may be omitted. Also, the guide lens 810 is positioned in contact with an incidence area S1 of the display 600, and an image projected from the guide lens 810 enters the incidence area S1 of the display 600.

Also, the description of the drawings will be given of an example in which the optical variable unit 900 is affixed to the inside of a side frame 720. As opposed to this, an exemplary embodiment of the present invention comprises embedding the optical variable unit 900 into the side frame 720 and forming them in an integrated manner.

As shown in (a) of FIG. 20, the optical variable unit 900 comprises an outer housing 910 affixed to one side of the side frame 720 and an inner housing 920 contained in the outer housing 910 and configured to be movable. The inner housing 920 may contain the controller 800 in it.

The controller 800 may be fixed into the inner housing 920. Alternatively, an exemplary embodiment of the present invention comprises integrating the controller 800 and the inner housing 920 together.

As shown in (b) of FIG. 20, a guide lens 810 may be provided to transmit a light signal between the controller 800 and the display 600. The guide lens 810 may project an image created by the controller 800 on the display 600. To this end, the end of the guide lens 810 may be positioned in contact with the incidence area S1 of the display 600.

Besides, the description of the controller 200 explained with reference to FIG. 5 will be substituted for a description of the controller 800.

The optical variable unit 900 may fine-tune the position of the controller 800 so as to change the position of an image transmitted as a light signal from the controller 800 and shown on the display 600.

Moreover, the optical variable unit 900 may change a projection area S2 of the display 600 or the light path of an image projected in a display area by changing the angle at which the controller 800 and the display 600 are affixed. In this instance, changing the projection area S2 comprises making a change in position such as shifting or making a change in shape or size.

As such, the optical variable unit 900 may solve the problem of a change in focal length caused by a deviation in the position of the glass 610 by changing the path of a light signal projected from the controller 800.

Specifically, the optical variable unit 900 may have a structure that finely rotates (tilts) the position of the controller 800 horizontally and/or vertically based on the incidence area S1 of the display 600, so as to change the direction of an image projected on the outside of the glass 610 in the projection area S2 of the display 600. In an example, in a case where the controller 800 is fixed into the inner housing 920, the inner housing 920 moves horizontally within the outer housing 910, which may cause the controller 800 to move horizontally.

A first direction guide hole H1 for horizontally guiding the inner housing 920 may be provided on one surface of the outer housing 910. In the drawings, the first direction guide hole H1 is illustrated as being formed on the top surface of the outer housing 910.

The first direction guide hole H1 may have the shape of a curve on a plane containing first and second horizontal axes x and y. In an example, each portion of the curve of the first direction guide hole H1 may have the shape of a partial arc having the same radius from the end of the guide lens 810, as shown in (a) of FIG. 7.

A housing protrusion P1 to be inserted into the first direction guide hole H1 may be formed at a portion of one surface of the inner housing 920 corresponding to one surface of the outer housing 910 where the first direction guide hole H1 is formed. In the drawings, the housing protrusion P1 is illustrated as being formed on the top surface of the inner housing 920.

Such a housing protrusion P1 may be formed integrally on the top of the inner housing 920, and the position of the inner housing 920 may be fine-tuned as the housing protrusion P1 moves. Accordingly, when the housing protrusion P1 is inserted into the first direction guide hole H1 and moves along the first direction guide hole H1 automatically or through the user's manipulation, the position of the inner housing 920 may be fine-tuned along the plane containing the first and second horizontal axes x and y.

As the housing protrusion P1 moves along the first direction guide hole H1, the controller 800 may pivot relative to the incidence area S1 of the display 600 along the plane containing the first and second horizontal axes x and y, while keeping the end of the guide lens 810 positioned in contact with the incidence area S1 of the display 600.

Alternatively, if there is no guide lens 810, the housing protrusion P1 and the first direction guide hole H1 may allow an image projected from the controller 800 to fall on the incidence area S1 of the display 600, and the controller 800 with the inner housing 920 may pivot along the plane containing the first and second horizontal axes x and y, relative to the incidence area S1 of the display 600.

Accordingly, the angle at which the image projected from the controller 800 falls on the incidence area S1 of the display 600 may be tuned along the plane containing the first and second horizontal axes x and y, and the path R of light projected on the outside in the projection area S2 of the display 600 may be adjusted horizontally. However, the direction or angle of tilt of the display 600 may vary depending on the optics. For example, the direction and angle of tilt may vary depending on where the optics used for the display 600 is diffraction optics, geometrical optics, or auxiliary optics.

Moreover, the optical variable unit 900 may be operated manually by an operator. For example, the operator may operate the optical variable unit 900 by rotating a dial or the like mounted on the outer housing 910, and the housing protrusion P1 may move a predetermined distance depending on the amount of rotation of the dial.

Alternatively, the optical variable unit 900 may move automatically by having its own motor or the like. For example, the controller 800 may rotate the motor or the like by receiving a signal from the sensor 630 and issuing a corresponding command.

(a) of FIG. 22 illustrates a partial perspective view of an optical variable unit 900-1 according to a second exemplary embodiment, and (b) of FIG. 22 illustrates a detailed view of a connecting structure of a controller 800 and a display 600. FIG. 23 illustrates the optical variable unit 900-1 of FIG. 22 when viewed from the side Unlike in the first exemplary embodiment in which the optical variable unit 900 (see FIG. 20) permits movement on the x-y plane, the optical variable unit 900-1 according to the second exemplary embodiment may permit movement both on the x-y plane and the y-z plane.

Specifically, the optical variable unit 900-1 may have a structure that finely rotates (tilts) the position of the controller 800 horizontally and/or vertically based on the incidence area S1 or display area of the display 600, so as to change the direction of an image projected on the outside of the glass 610 in the projection area S2 of the display 600. In an example, in a case where the controller 800 is fixed into the inner housing 920, the inner housing 920 moves horizontally and/or vertically within the outer housing 910, which may cause the controller 800 to move horizontally and/or vertically.

A second direction guide hole H2 for vertically guiding the inner housing 920 may be provided on one surface of the outer housing 910. In the drawings, the second direction guide hole H2 is illustrated as being formed on a side surface of the outer housing 910.

The second direction guide hole H2 may have the shape of a curve on a vertical plane z intersecting the first and second horizontal axes x and y. In an example, each portion of the curve of the second direction guide hole H2 may have the shape of a partial arc having the same radius from the end of the guide lens 810, as shown in (a) of FIG. 9.

A housing protrusion P2 to be inserted into the second direction guide hole H2 may be formed at a portion of one surface of the inner housing 920 corresponding to one surface of the outer housing 910 where the second direction guide hole H2 is formed. In the drawings, the housing protrusion P2 is illustrated as being formed on a side surface of the inner housing 920.

Such a housing protrusion P2 may be formed integrally on the side of the inner housing 920, and the position of the inner housing 920 may be fine-tuned as the housing protrusion P2 moves. Accordingly, when the housing protrusion P2 is inserted into the second direction guide hole H2 and moves along the second direction guide hole H2 automatically or through the user's manipulation, the position of the inner housing 920 may be fine-tuned along the vertical plane z intersecting the first and second horizontal axes x and y.

As the housing protrusion P2 moves along the second direction guide hole H2, the controller 800 may pivot relative to the incidence area S1 of the display 600 along the plane z perpendicular to the first and second horizontal axes x and y, while keeping the end of the guide lens 810 positioned in contact with the incidence area S1 of the display 600.

Alternatively, if there is no guide lens 810, the housing protrusion P2 and the second direction guide hole H2 may allow an image projected from the controller 800 to fall on the incidence areas S1 of the display 600, and the controller 800 with the inner housing 920 may pivot along the vertical plane z intersecting the first and second horizontal axes x and y, relative to the incidence area S1 of the display 600.

Accordingly, the angle at which the image projected from the controller 800 falls on the incidence area S1 of the display 600 may be tuned along the vertical plane z, and the position of the image projected in the projection area S2 of the display 600 may be adjusted along the vertical axis z.

In the above, a method of correcting the optical alignment of the left and right eyes by physically changing the angle of image light incident on the displays 600 from the controller 800 has been described.

Hereinafter, a method of correcting the optical alignment of the left-eye display 600a and right-eye display 600b by controllably moving the display area (or projection area S2) will be described.

FIG. 24 is a view explaining how display areas (or projection areas S2) are moved by the amount of deviation from alignment. FIG. 25 is a flowchart explaining a method of alignment adjustment in the case of FIG. 24.

The displays 600 set a field of view (FOV) where the user can see without moving their eyes, within the area of the glasses 610, and use part of the field of view as the projection areas S2 or the display areas. Thus, the field of view has a buffer area which is not used as the projection areas S2.

In an electronic device 500-1 according to an exemplary embodiment of the present invention, the controller 800 may change the size, shape, or position of the projection areas S2 by using the buffer area.

Referring to FIG. 24, even the projection areas S2 of the same size may have different convergence distances D if they are different in position.

For example, if the projection area S2 of the display 600a for the left eye moves a distance of d to the left and the projection area S2 of the display 600b for the right eye is moved a distance of d to the right, the projection area S2 of the display 600a for the left eye and the projection area S2 of the display 600b for the right eye become distant from each other.

In this case, as compared to the light path R1 before the projection area S2 is moved, the light path R2 allows for a longer convergence distance D after the projection area S2 is moved outward, thereby rendering a sharp image.

On the contrary, if the projection area S2 of the display 600a for the left eye is moved to the right and the projection area S2 of the display 600b for the right eye is moved to the left, the projection area S2 of the display 600a for the left eye and the projection area S2 of the display 600b for the right eye become close to each other.

In this case, as compared to the light path R1 before the projection area S2 is moved, the light path R2 allows for a shorter convergence distance D after the projection area S2 is moved outward, thereby rendering a sharp image.

Using this principle, deviations on the displays 600 can be corrected.

Referring to FIG. 25, when the user wears the electronic device 500-1 (or enters a command), the controller 800 displays a rendered image with an infinite focal length on the displays 600 (S100). When the user looks ahead while viewing the rendered image, the lines of sight of the two eyes become parallel to each other, thereby providing an infinite focal length (S110). In this instance, the eye tracking sensors 630 detect the pupils of the two eyes and transmit information about the positions of the pupils of the two eyes to the controller 800 (S120).

The controller 800 determines the amount of deviation from the default values (for example, focal length information) by comparing the information received from the sensors 630 with the default eye positions (S130). In this case, information about the amount of deviation may include information about a change in in focal length or orientation angle.

Moreover, the controller 800 may calculate the amount of movement of the projection areas S2 of the displays 600 corresponding to measured deviations (S140). The amount of movement of the projection areas S2 may be calculated in pixels. If the projection areas S2 are moved by a pixels in the x-axial direction and b pixels in the y-axial direction, respectively, the amount of movement may be represented as (a, b).

Lastly, the controller 800 moves (offsets) the projections areas S2 by a calculated amount and displays a corresponding image (S150). The movement of the projection areas S2 comprise shifting the projection areas S2 by (a, b) pixels.

FIG. 26 is a view explaining how 3D camera areas S3 are moved by the amount of deviation from alignment. FIG. 27 is a flowchart explaining a method of alignment adjustment in the case of FIG. 26.

3D cameras (stereo cameras or stereoscopic cameras) 640 may be used to capture the same object by using two cameras spaced apart from each other, get depth information by comparing two captured images, and let the user to perceive the depth. Using the 3D cameras 640, it is possible to take a stereoscopic image or video with a sense of depth.

In an electronic device 500-2 according to another exemplary embodiment of the present invention, the 3D cameras 640 may be installed on the displays 600 for both eyes, respectively. In an example, the 3D cameras 640 may be respectively placed on the outermost front parts of the displays 600. Alternatively, they may be placed in different positions.

However, if different users with different facial shapes or sizes use the electronic device 500-2 as described above, a deviation occurs in the displays 600 as the frames 700 deform, which may result in moving the 3D cameras 640 into different positions from the default ones.

Accordingly, there is a need to correct for a change in position of the 3D cameras 640 in order to get expected results from the 3D cameras 640. For example, when sensing depth through a comparison of images from the 3D cameras 640 positioned for both eyes, if the positions of the cameras change, it is not possible to obtain accurate depth information. Thus, there is a need to compensate camera image areas S3 to suit the change.

The amount of deviation on the 3D cameras 640 may be matched to the amount of deviation on the displays 600. As a result, the same method as described with reference to FIG. 24 and FIG. 25 may be used.

Referring to FIG. 27, when the user wears the electronic device 500-2 (or enters a command), the controller 800 displays a rendered image with an infinite focal length on the displays 600 (S200). When the user looks ahead while viewing the rendered image, the lines of sight of the two eyes become parallel to each other, thereby providing an infinite focal length (S210). In this instance, the eye tracking sensors 630 detect the pupils of the two eyes and transmit information about the positions of the pupils of the two eyes to the controller 800 (S220).

The controller 800 compares the information received from the sensors 630 with the default eye positions and determines the amount of deviation from the default values (for example, focal length information) (S230). In this case, information about the amount of deviation may include information about a change in in focal length or orientation angle.

Moreover, the controller 800 may estimate a change in position of the 3D cameras 640 based on measured deviations. Also, the controller 800 may calculate the amount of movement of the camera image areas S3 corresponding to the change in position of the 3D cameras 640 (S240). The amount of movement of the camera image areas S3 may be calculated in pixels. If the camera image areas S3 are moved by a pixel in the x-axial direction and b pixels in the y-axial direction, respectively, the amount of movement may be represented as (a, b).

Lastly, the controller 800 moves (offsets) the camera image areas S3 by a calculated amount and extracts depth information (S250). The movement of the camera image areas S3 comprise shifting the camera image areas S3 by (a, b) pixels.

Certain embodiments or other embodiments of the invention described above are not mutually exclusive or distinct from each other. Any or all elements of the embodiments of the invention described above may be used or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

The foregoing detailed description should not be construed as restrictive in all aspects but is to be considered as illustrative. The scope should be determined by reasonable interpretation of the appended claims, and all changes that come within the equivalent scope are included in the scope.

An electronic device according to the present invention is capable of physically or controllably re-adjusting the optical alignment of two glasses for both eyes even if a deviation occurs when the user wears the electronic device. Accordingly, there is no need for a metal structure for preventing a deviation in the alignment of the two lenses, thereby making the device smaller and more lightweight.

What is claimed is:

1. An electronic device comprising:
   a first display for the left eye of a user;
   a second display for the right eye of the user, that is spaced apart from the first display in a first direction;
   a controller that transmits an image to the first display or the second display;
   frames that hold the first display and the second display and are supported on the user's head; and
   a housing in which the controller is located, wherein the housing is capable of varying an optical alignment of the first display or the second display,
   wherein the housing includes an inner housing to which the controller is fixed, an outer housing to which the inner housing is installed, a first direction guide hole formed on a surface of the outer housing to guide the inner housing in a horizontal direction, and a housing protrusion formed on the inner housing and inserted into the first direction guide hole.

2. The electronic device of claim 1,
   wherein the housing is capable of varying the optical alignment by changing an angle at which the image is transmitted from the controller to the first display or the second display.

3. The electronic device of claim 2, wherein the controller has a guide lens for transmitting the image to the displays,
   the displays each comprising an incidence area positioned close to an end of the guide lens, where the image enters through the guide lens, and a projection area where the image is projected,
   wherein the housing changes a relative angle between the guide lens and the displays.

4. The electronic device of claim 3, wherein the housing changes the relative angle in a second direction that connects from the end of the guide lens to the incidence area and in a third direction that connects from the incidence area to the projection area.

5. The electronic device of claim 1, wherein the frames are made of elastic material to deform when the user wears the electronic device, the first display or the second display are configured to change position upon deformation of the frames, and the housing corrects error in the optical alignment which occurs as the first display or the second display changes position upon deformation of the frames.

6. The electronic device of claim 1, further comprising a sensor for detecting an amount of deviation on the first display or the second display.

7. The electronic device of claim 6,
   wherein the controller determines a degree to which the housing varies through information provided from the sensor.

8. The electronic device of claim 7, further comprising a driver for driving the housing,
   wherein the controller drives the housing through the information provided from the sensor.

9. The electronic device of claim 7, wherein the sensor detects a pupil of the user, and the controller determines the amount of deviation on the first display or the second display through the information provided from the sensor and thereby determines the degree to which the housing varies.

10. The electronic device of claim 9, wherein the controller transmits a stored image to the first display or the second display, and the sensor detects the pupil of the user viewing the image.

11. The electronic device of claim 10, wherein the controller transmits the stored image to the first display or the second display at a focal length approaching infinity, and determines the amount of deviation on the first display or the second display by comparing a focal length of the user determined based on the information provided from the sensor and a preset focal length.

12. The electronic device of claim 8, wherein the controller shifts an image provided to the first display or the second display by driving the housing.

13. The electronic device of claim 7, wherein the first display and the second display each have a 3D camera,
    wherein the controller gets an image from the 3D camera and creates stereoscopic image-related information.

14. The electronic device of claim 13, wherein the controller performs image processing by correcting the image from the 3D camera through the information provided from the sensor.

15. The electronic device of claim 14, wherein the controller determines an amount of deviation on the 3D camera through the information provided from the sensor, and performs image processing by shifting the image from the 3D camera by a number of pixels corresponding to the amount of deviation on the 3D camera.

16. An electronic device comprising:
    a first display for the left eye of a user;
    a second display for the right eye of the user, that is spaced apart from the first display in a first direction;
    frames that hold the first display and the second display and are supported on the user's head;
    a first sensor for detecting an amount of deviation on the first display;
    a second sensor for detecting an amount of deviation on the second display;
    a housing in which the controller is located, wherein the housing is capable of varying an optical alignment of the first display or the second display; and
    a controller that transmits an image to the first display or the second display and corrects the optical alignment of the first display or the second display through information provided from the first sensor and the second sensor,
    wherein the housing includes an inner housing to which the controller is fixed, an outer housing to which the inner housing is installed, a first direction guide hole formed on a surface of the outer housing to guide the inner housing in a horizontal direction, and a housing protrusion formed on the inner housing and inserted into the first direction guide hole, and
    wherein the controller corrects the optical alignment by changing a position of the image displayed on the first display or the second display.

17. The electronic device of claim 16, wherein the controller transmits a stored image to the first display and the second display, the first and second sensors respectively detect the pupils of the user viewing the image, and the controller determines the amount of deviation on the first display or the second display through the information provided from the sensors and thereby corrects the optical alignment.

18. The electronic device of claim 17, wherein the controller transmits the stored image to the first display and the second display at a focal length approaching infinity, and determines the amount of deviation on the first display or the second display by comparing a focal length of the user determined based on the information provided from the sensors and a preset focal length.

\* \* \* \* \*